United States Patent [19]
Furuhata et al.

[11] Patent Number: 5,907,364
[45] Date of Patent: May 25, 1999

[54] DISPLAY DEVICE FOR INFORMATION SIGNALS

[75] Inventors: Takashi Furuhata, Kamakura; Sadao Kubota; Shutoku Watanabe, both of Yokohama, all of Japan

[73] Assignee: Hitachi, Ltd., Tokyo, Japan

[21] Appl. No.: 08/669,269

[22] Filed: May 29, 1996

[51] Int. Cl.$^6$ ............................. H04N 11/22; H04N 7/01
[52] U.S. Cl. .................... 348/459; 348/443; 348/447; 348/43
[58] Field of Search ..................... 348/441, 443, 348/444, 447, 448, 456, 458, 459, 555, 43; H04N 5/93, 5/46, 7/01, 11/22

[56] References Cited

U.S. PATENT DOCUMENTS

| | | | |
|---|---|---|---|
| 4,672,446 | 6/1987 | Ikeda et al. | 348/447 |
| 4,996,595 | 2/1991 | Naito et al. | 348/447 |
| 5,029,001 | 7/1991 | Tanaka et al. | 348/447 |

FOREIGN PATENT DOCUMENTS

| | | |
|---|---|---|
| 4-334289 | 5/1991 | Japan . |
| 5-145904 | 11/1991 | Japan . |
| 6-225269 | 1/1993 | Japan . |
| 6-334977 | 12/1994 | Japan . |

OTHER PUBLICATIONS

IEEE Transactions on Consumer Electronics, vol. CE–33, No. 3, Aug. 1987 "Linear and Nonlinear Procedures for Flicker Reduction" (This document provided in English).

TV Engrs. of Japan vol. 41, No. 6, 1987, pp. 549–555 "Conditions Providing for Field–Sequential Stereoscopic Vision" (English translation of Abstract only).

*Primary Examiner*—Michael Lee
*Attorney, Agent, or Firm*—Fay, Sharpe, Beall, Fagan, Minnich & McKee, LLP

[57] ABSTRACT

A display device for information signals which performs highly efficient image display of a standard television signal, a high definition television signal, a progressive scanning television signal or a stereoscopic television signal on the same screen has a first signal input unit applied with the standard television signal, a second signal input unit applied with the high definition television signal, progressive scanning television signal or stereoscopic television signal, a mode designation unit for designating a mode for display of one of the signals, a signal conversion unit including a write unit for writing the first signal, at a frequency thereof, to memories and a read unit for reading the memories at a frequency which is nearly twice that of the first signal, a signal switching unit, a signal processing unit and a deflection switching unit, whereby a first display signal from the signal conversion unit or a second display signal from the second input terminal is selected and image-displayed on the same display unit through a deflection system. Through this, the cost of the device can be reduced, the standard television signal having less scanning lines can be displayed with substantially the same number of scanning lines as that of the high definition television signal, various kinds of disturbances can be eliminated to improve the image quality and a stereoscopic image can also be displayed.

15 Claims, 14 Drawing Sheets

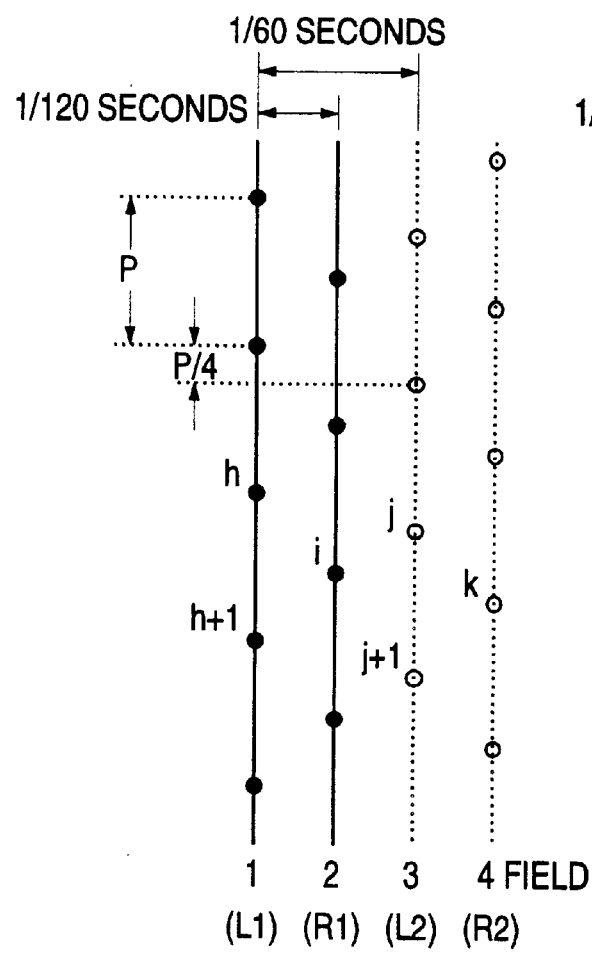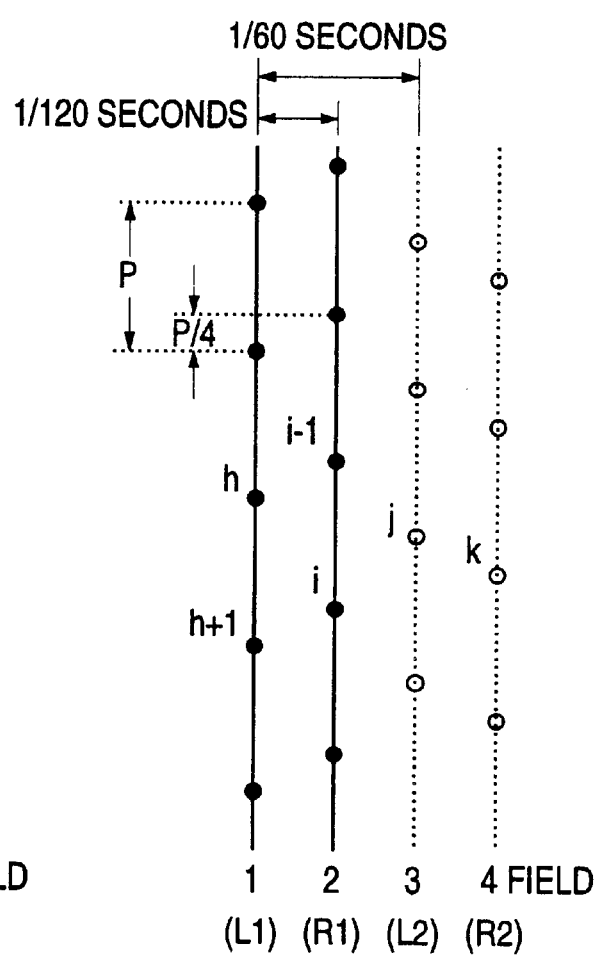

DISPLAY DEVICE FOR INFORMATION SIGNALS

BACKGROUND OF THE INVENTION

The present invention relates to a display device for information signals which is suitable for highly efficient image display of a standard television signal of, for example, NTSC system, a high definition television signal of, for example, high definition system, a television signal of progressive scanning system or a stereoscopic television signal based on television signals of a plurality of channels.

Available as the conventional television system is the standard television system including the NTSC system (or ED system or ED 2 system), PAL system (or PAL plus system) and SECAM system. In the case of the NTSC system, the number of scanning lines per frame is set to N1=525, the field frequency to fV1=59.94 Hz (equivalent to the frame frequency being fV1/2=29.97 Hz), the horizontal scanning frequency to fH1=15.73 kHz and the aspect ratio to 4:3.

On the other hand, with recent improvements in the television system, high definition of image has been promoted and a high definition television (HDTV) system such as high definition system and ATV system in which the number of scanning lines is nearly twice that of the standard television system to drastically improve the image quality has been contrived and is about to be broadcast. In the case of the high definition system, the number of scanning lines per frame is set to N2=1125, the field frequency to fV2=60 Hz (equivalent to the frame frequency being fV2/2=30 Hz), the horizontal scanning frequency to fH2=33.75 kHz and the aspect ratio to 16:9. In high definition image display for use in personal computers, a television signal of progressive scanning type is used and for example, the number of scanning lines per frame is set to N2=1050, the field frequency to fV2=60 Hz (equivalent to the frame frequency being fV2/2=30 Hz), the horizontal scanning frequency to fH2=31.5 kHz and the aspect ratio to 4:3.

In a recent example as reported in, for example, a literature "Conditions Providing for Field-sequence Stereoscopic Vision" (Isono et al, J. Inst. TV Engrs. of Japan, Vol. 41, No.6, pp.549–555, 1987), a study of stereoscopic television in which a stereoscopic image is time-division displayed by using video information signals of two channels based on the aforementioned standard television system has been proceeded with. In this case, of two video information signals of first and second channels, one video information signal of the first channel is assigned with image information (L) for left eye and the other video information signal of the second channel is assigned with image information (R) for right eye. In case the above NTSC system is applied to this stereoscopic television, the number of scanning lines per frame is set to N1=525, the field frequency to fV1=59.94 Hz (equivalent to the frame frequency being fV1/2=29.97 Hz), the horizontal scanning frequency to fH1=15.73 kHz and the aspect ratio to 4:3.

Therefore, a future television system is expected to take a coexistent form of the existing standard television system with the stereoscopic television system using a plurality of channels and the high definition television system and progressive scanning television system of quite different types, and it is preferable that a future display device for television signals be a single device which can selectively display all of the television signals pursuant to the plurality of systems.

In a recent example to meet the above needs, a device has been practiced which can selectively display the standard television signal and the high definition television signal in a high definition receiver set and an example of this type of display device is disclosed in, for example, JP-A-6-225269.

In the aforementioned conventional display device for television signals which selectively displays the standard television signal and high definition television signal, however, the standard television signal and the high definition television signal which are different from each other in signal format (especially, horizontal scanning frequency) are switched for display and therefore, deflection systems which are greatly different for the two modes must be operated independently, having difficulties with reduction of the cost of the device.

For an increase in cost of the device, the existing standard television signal is displayed with the conventional image quality at the most, facing disadvantages that on a large-sized display (such as a Braun tube) of high brightness and high definition, various kinds of disturbances including a flicker disturbance and a line structure become conspicuous and the image quality is adversely deteriorated to degrade the performance meeting the cost.

The aforementioned JP-A-6-225269 discloses the display device for television signals adapted to selectively display the standard television signal and high definition television signal but neither considers at all stereo display of the stereoscopic television signal nor discloses at all measures for improving the monaural display image quality of the standard television signal.

In the above literature by Isono et al, an example of a stereo display device for stereoscopic television signals is disclosed but neither monaural display of the high definition television signal and standard television signal nor image quality improvements of the monaural display are disclosed at all; and a stereoscopic television conformable to the standard television system is disclosed but any stereoscopic television conformable to other television systems is not disclosed.

Therefore, in the light of the fact that conditions of putting images of various media in service will come up, realization of a device has been desired strongly which can be a single device capable of performing image display of not only the standard television signal but also the stereoscopic television signal, high definition television signal and progressive scanning television signal and at the same time attaining high image quality.

SUMMARY OF THE INVENTION

A principal object of the present invention is to provide, at low costs, a device which can be a single device capable of highly efficiently displaying the standard television signal, stereoscopic television signal, high definition television signal and progressive scanning television signal which are different from each other in the number of channels, in the number of scanning lines, in the horizontal scanning frequency and in the aspect ratio and greatly improving the image quality by eliminating various kinds of disturbances upon display of the standard television signal.

Another object of the present invention is to provide a device capable of displaying not only the standard television signal but also signals conformable to the high definition television and progressive scanning television in a scanning pattern substantially common to all of the signals without disturbance and with high image quality when monaural display is effected.

Still another object of the present invention is to provide a device capable of coping with the stereoscopic television of not only a system conformable to the conventional standard television but also various stereoscopic television systems conformable to the high definition television and progressive scanning television and also performing display in a scanning pattern substantially common to that of the monaural display without disturbance and with high image quality.

To accomplish the above objects, the present invention is first constructed as below when a standard television signal of one channel is monaurally displayed.

A display device for inputting either one of at least first and second two information signals and performing image display comprises, when the first information signal is an information signal of one channel based on video information of a first television signal in which the field frequency is fV1, the number of scanning lines in one frame is N1, each frame is constructed of first and second two fields each having N1/2 scanning lines and the horizontal scanning frequency is fH1 (=N1×fV1/2), first reproduction means for inputting the first information signal and reproducing a video information signal of one channel in each of the first and second fields every frame of the first information signal;

first signal conversion means for converting the video information signal from the first reproduction means into a first display signal in which the field frequency fV is nearly twice that of the first television signal (fV≈2×fV1), the number of scanning lines N has, within the same period of one frame as that of the first television signal, a value which ranges from nearly twice to twice or more that of the first television signal, first, second, third and fourth four fields are contained within the period of one frame, each of the four fields has the number of scanning lines having a value which is near N/4, and the horizontal scanning frequency fH has a value which ranges from nearly twice to twice or more that of the first television signal; and first signal generation means for generating a synchronous information signal so structured as to cause the first display signal to be displayed in such a phase relation that respective lines to be displayed on the screen in one of the first, second, third and fourth fields do not overlap those to be displayed in another field.

Preferably, the first signal conversion means includes:

means for performing conversion such that the number of scanning lines N of the first display signal satisfies N=4M+2 (where M is integer), an m-th line in the first field of the video information signal is related to an h-th line in the first field and an i-th line in the second field of the first display signal and an n-th line in the second field of the video information signal is related to a j-th line in the third field and a k-th line in the fourth field of the first display signal, whereby the first display signal is displayed in such a phase relation that a k-th line in the fourth field is nearly 2:1 interlaced between an h-th line and an (h+1)-th line in the first field of the first display signal, a j-th line in the third field is nearly 2:1 interlaced between an i-th line and an (i+1)-th line in the second field, and the second and third fields are displaced by nearly 1/4 of a scanning line interval in the vertical direction in relation to the first and fourth fields, respectively.

Next, when a stereoscopic television signal constructed of standard television signals of two channels is stereoscopically displayed, the following construction is provided.

A display device comprises, when the second information signal is information signals of two channels based on video information of a second television signal in which the field frequency is fV1, the number of scanning lines in one frame is N1, each frame is constructed of first and second two fields each having N1/2 scanning lines and the horizontal scanning frequency is fH1, second reproduction means for inputting the second information signal and reproducing a video information signal L of a first channel and a video information signal R of a second channel in each of the first and second fields every frame of the second information signal;

second signal conversion means for converting the first channel video information signal L and second channel video information signal R from the second reproduction means into a second display signal in which the field frequency has a value which is equal to or near fV, the number of scanning lines has, within the same period of one frame as that of the second television signal, a value which is equal to or near N, first, second, third and fourth four fields are contained within the period of one frame, each of the four fields has the number of scanning lines having a value which is near N/4, and the horizontal scanning frequency has a value which is equal to or near fH, the conversion being such that an m-th line in the first field and an n-th line in the second field of the first channel video information signal L are related to an h-th line in the first field and a j-th line in the third field of the second display signal, and an m-th line in the first field and an n-th line in the second field of the second channel video information signal R are related to an i-th line in the second field and a k-th line in the fourth field of the second display signal, respectively; and second signal generation means for generating a second synchronous information signal so structured as to cause the second display signal to be displayed in such a phase relation that a j-th line in the third field is nearly 2:1 interlaced between an h-th line and an (h+1)-th line in the first field of the second display signal and a k-th line in the fourth field is nearly 2:1 interlaced between an i-th line and an (i+1)-th line in the second field.

When a stereoscopic television signal constructed of a standard television signal of one channel is stereoscopically displayed, the following construction is provided.

A display device comprises, when the second information signal is information signals of two channels based on video information of a second television signal in which the field frequency has a value which is equal to or near fV1, the number of scanning lines in one frame has a value which is equal to or near N1, each frame is constructed of first and second two fields each having the number of scanning lines having a value which is near N1/2 and the horizontal scanning frequency has a value which is equal to or near fH1, second reproduction means for inputting the second information signal and reproducing a video information signal L of a first channel and a video information signal R of a second channel in the first and second fields of the second information signal every frame thereof;

second signal conversion means for converting the first channel video information signal L and second channel video information signal R from the second reproduction means into a second display signal in which the field frequency has a value which is equal to or near fV, the number of scanning lines has, within the same period of one frame as that of the second television signal, a value which is equal to or near N, first, second, third and fourth four fields are contained within the period of one frame, each of the four fields has the number of scanning lines having a value which is near N/4, and the horizontal scanning frequency has a value which is equal to or near fH, the conversion being such that an m-th line in the first field containing the first channel video information signal L is related to an h-th line in the first field and a j-th line in the third field of the second display signal, and an n-th line in the second field containing the second channel video information signal R is related to an i-th line in the second field and a k-th line in the fourth lines of the second display signal; and second signal generation means for generating a second synchronous information signal so structured as to cause the second display signal to be displayed in such a phase relation that an i-th line in the second field is nearly 2:1 interlaced between an h-th line and an (h+1)-th line in the first field of the second display signal and a k-th line in the fourth field is nearly 2:1 interlaced between a j-th line and a (j+1)-th line in the third field.

When a stereoscopic television signal constructed of a progressive scanning television signal (or high definition television signal) of one channel is stereoscopically displayed, the following construction is provided.

A display device comprises, when the second information signal is information signals of two channels based on video information of a second television signal in which the field frequency is fV2, the number of scanning lines in one frame is N2 (N2>N1), each frame is constructed of first and second two fields each having N2/2 scanning lines and the horizontal scanning frequency is fH2 (=N2×fV2/2), second reproduction means for inputting the second information signal and reproducing a video information signal L of a first channel in the first half of each of the first and second fields and a video information signal R of a second channel in the second half every frame;

second signal conversion means for converting the first channel video information signal L and second channel video information signal R from the second reproduction means into a second display signal in which the field frequency is nearly twice that of the second television signal, the number of scanning lines has, within the same period of one frame as that of the second television signal, a value which is equal to or near N2, first, second, third and fourth four fields are contained within the period of one frame, each of the four fields has the number of scanning lines having a value which is near N2/4, and the horizontal scanning frequency has a value which is equal to or near fH2, the conversion being such that an m-th line in the first half of the first field containing the first channel video information signal L and an m'-th line in the second half of the first field containing the second channel video information signal R are related to an h-th line in the first field and an i-th line in the second field of the second display signal, respectively, and an n-th line in the first half of the second field containing the first channel video information signal L and an n'-th line in the second half of the second field containing the second channel video information signal R are related to a j-th line in the third field and a k-th line in the fourth field of the second display signal, respectively; and second signal generation means for generating a second synchronous information signal so structured as to cause the second display signal to be displayed in such a phase relation that a j-th line in the third field is nearly 2:1 interlaced between an h-th line and an (h+1)-th line in the first field of the second display signal and a k-th line in the fourth field is nearly 2:1 interlaced between an i-th line and an (i+1)-th line in the second field.

Alternatively, a display device comprises, when the second information signal is information signals of two channels based on video information of a second television signal in which the field frequency is fV2, the number of scanning lines in one frame is N2 (N2>N1), each frame is constructed of first and second two fields each having N2/2 scanning lines and the horizontal scanning frequency is fH2 (=N2×fV2/2), second reproduction means for inputting the second information signal and reproducing a video information signal L of a first channel in the first field and a video information signal of a second channel in the second field of the second information signal every frame thereof;

second signal conversion means for converting the first channel video information signal L and second channel video information signal R from the second reproduction means into a second display signal in which the field frequency is nearly twice that of the second television signal, the number of scanning lines has, within the same period of one frame as that of the second television signal, a value which is equal to or near N2, first, second, third and fourth four fields are contained within the period of one frame, each of the four fields has the number of scanning lines having a value which is near N2/4, and the horizontal scanning frequency has a value which is equal to or near fH2, the conversion being such that an m-th line occurring every other line and an m'-th line occurring every other remaining line in the first field containing the first channel video information signal L are related to an h-th line in the first field and a j-th line in the third field of the second display signal, respectively, and an n-th line occurring every other line and an n'-th line occurring every other remaining line in the second field containing the second channel video information signal R are related to an i-th line in the second field and a k-th line in the fourth field of the second display signal, respectively; and second signal generation means for generating a second synchronous information signal so structured as to cause the second display signal to be displayed in such a phase relation that a j-th line in the third field is nearly 2:1 interlaced between an h-th line and an (h+1)-th line in the first field of the second display signal and a k-th line in the fourth field is nearly 2:1 interlaced between an i-th line and an (i+1)-th line in the second field.

Further, when a high definition television signal (or progressive scanning television signal) of one channel is monaurally displayed, the following construction is provided.

A display device comprises, when the second information signal is an information signal of one channel based on video information of a second television signal in which the field frequency is fV2, the number of scanning lines in one frame is N2 (N2>N1), each frame is constructed of first and second two fields each having N2/2 scanning lines and the horizontal scanning line frequency is fH2 (=N2×fV2/2), second reproduction means for inputting the second information signal and reproducing a video information signal of one channel in each of the first and second fields every frame of the second information signal; and second signal generation means for generating, from the video information signal from the second reproduction means, a second display signal having a field frequency of fV2, the number of scanning lines in one frame which is N2 and a horizontal scanning frequency of fH2.

Further, when a progressive scanning television signal (or high definition television signal) of one channel is monaurally displayed, the following construction is provided.

A display device comprises, when the second information signal is an information signal based on video information of a second television signal in which the field frequency is fV2, the number of scanning lines in one frame is N2, each frame is constructed of first and second two fields each having N2/2 scanning lines and the horizontal scanning frequency is fH2 (=N2×fV2/2), second reproduction means for inputting the second information signal and reproducing a video information signal of one channel in each of the first and second fields every frame of the second information signal;

second signal conversion means for converting the video information signal from the second reproduction means into a second display signal in which the field frequency fV is nearly twice that of the second television signal (fV≈2×fV2), the number of scanning lines has, within the same period of one frame as that of the second television signal, a value which is equal to or near N2, first, second, third and fourth four fields are contained within the period of one frame, each of the four fields has the number of scanning lines having a value which is near N2/4, and the horizontal scanning frequency has a value which is equal to or near fH2, the conversion being such that an m-th line occurring every other line and an m'-th line occurring every other remaining line in the first field of the video information signal are related to an h-th line in the first field and an i-th line in the second field of the second display signal, respectively, and an n-th line occurring every other line and an n'-th line occurring every other remaining line in the second field of the video information signal are related to a j-th line in the third field and a k-th line in the fourth field of the second display signal, respectively; and second signal generation means for generating a second synchronous information signal so structured as to cause the second display signal to be displayed in such a phase relation that respective lines to be displayed on the screen in one of the first, second, third and fourth fields do not overlap those to be displayed in another field.

Alternatively, a display device comprises, when the second information signal is an information signal based on video information of a second television signal in which the field frequency is fV2, the number of scanning lines in one frame is N2, each frame is constructed of first and second two fields each having N2/2 scanning lines and the horizontal scanning frequency is fH2 (=N2×fV2/2), second reproduction means for inputting the second information signal and reproducing a video information signal of one channel in each of the first and second fields every frame of the second information signal;

second signal conversion means for converting the video information signal from the second reproduction means into a second display signal in which the field frequency fV is nearly twice that of the second television signal (fV≈2×fV2), the number of scanning lines has, within the same period of one frame as that of the second television signal, a value which is equal to or near N2, first, second, third and fourth four fields are contained within the period of one frame, each of the four fields has the number of scanning lines having a value which is near N2/4 and the horizontal scanning frequency has a value which is equal to or near fH2, the conversion being such that an m-th line occurring every other line and an m'-th line occurring every other remaining line in the first field of the video information signal are related to an h-th line in the first field and a j-th line in the third field of the second display signal, respectively, and an n-th line occurring every other line and an n'-th line occurring every other remaining line in the second field of the video information signal are related to an i-th line in the second field and a k-th line in the fourth field of the second display signal, respectively; and second signal generation means for generating a second synchronous information signal so structured as to cause the second display signal to be displayed in such a phase relation that respective lines to be displayed on the screen in one of the first, second, third and fourth fields do not overlap those to be displayed in another field.

With the above construction, in case the standard television signal is monaurally displayed, a television signal pursuant to, for example, the existing NTSC system in which the number of scanning lines is N1 (=525) and interlacing is effected between adjacent fields to provide a scanning line interval of 1/N1 (=1/525) is converted into a signal in which the number of scanning lines is nearly doubled to amount up to N (for example, N is selected to be 1050, 1051, 1125 or 1126) and interlacing is effected between adjacent fields to provide a scanning line interval of 1/N and the converted signal is displayed, so that the scanning line structure becomes difficult to detect and the line structure can be eliminated visually to reduce line flicker, thus promoting the mass nature to make images lustrous and providing high image quality.

Further, since the field frequency is also nearly doubly (fV≈120 Hz) converted for display, flicker disturbance which has hitherto been conspicuous at a large area of an image can be eliminated and visually stable images can be obtained.

The number of scanning lines is converted into a nearly doubled one for display in this manner and therefore, the horizontal scanning frequency fH has a value which is substantially equal to or near the horizontal scanning frequency fH2 of the high definition television signal, that is, fH≈33.72 kHz in the case of N=1125 or fH≈31.50 kHz in the case of N=1051 and the deflection system of the receiver set can be used in common to display of the standard television signal and display of the high definition television signal, with the result that the reduction of cost of the device can be realized easily.

Next, in case a stereoscopic television signal constructed of the standard television signals of first and second two channels is stereoscopically displayed, the two channel signals are time-division multiplexed to a signal of one channel and displayed with the number of scanning lines N nearly doubled (for example, N is set to 1051, 1052, 1124 or 1125) and therefore, the horizontal scanning frequency fH has a value which is substantially equal to or near the horizontal scanning frequency fH2 of the high definition television signal, that is, fH≈33.72 kHz in the case of N=1125 or fH≈31.50 kHz in the case of N=1051 and in this case, too, the deflection system of the receiver set can be used in common to display of the stereoscopic television signal and display of the high definition television signal, thereby facilitating realization of reduction in cost of the device.

The stereoscopic television can be visualized as a stereoscopic image by means of, for example, liquid crystal shutter glasses by switching left and right shutter lenses alternately in synchronism with fields of the display signal to permit left eye image information (L) to be visualized by the left eye and right eye image information (R) to be visualized by the right eye. Since the field frequency of this display signal is given by fV (≈120 Hz), images are visualized by the left and right eyes, respectively, at a half field frequency fV1 (≈60 Hz). In other words, images are visualized at the same field frequency as that of the standard television signal and consequently, no flicker disturbance is perceived and unnaturalness can be eliminated to provide natural stereo images.

BRIEF DESCRIPTION OF THE DRAWINGS

Preferred embodiments of the present invention will now be described in conjunction with the accompanying drawings, in which:

FIG. 14A and FIG. 14B are diagrams showing scanning line structures for the television signal based on FIG. 13.

DESCRIPTION OF THE PREFERRED EMBODIMENTS

An embodiment directed to a case where the present invention is applied to a device for selectively displaying a video signal of the standard television system, a video signal of the high definition television system and a video signal of the stereoscopic television system will be described hereunder with reference to the drawings.

Figure 1:
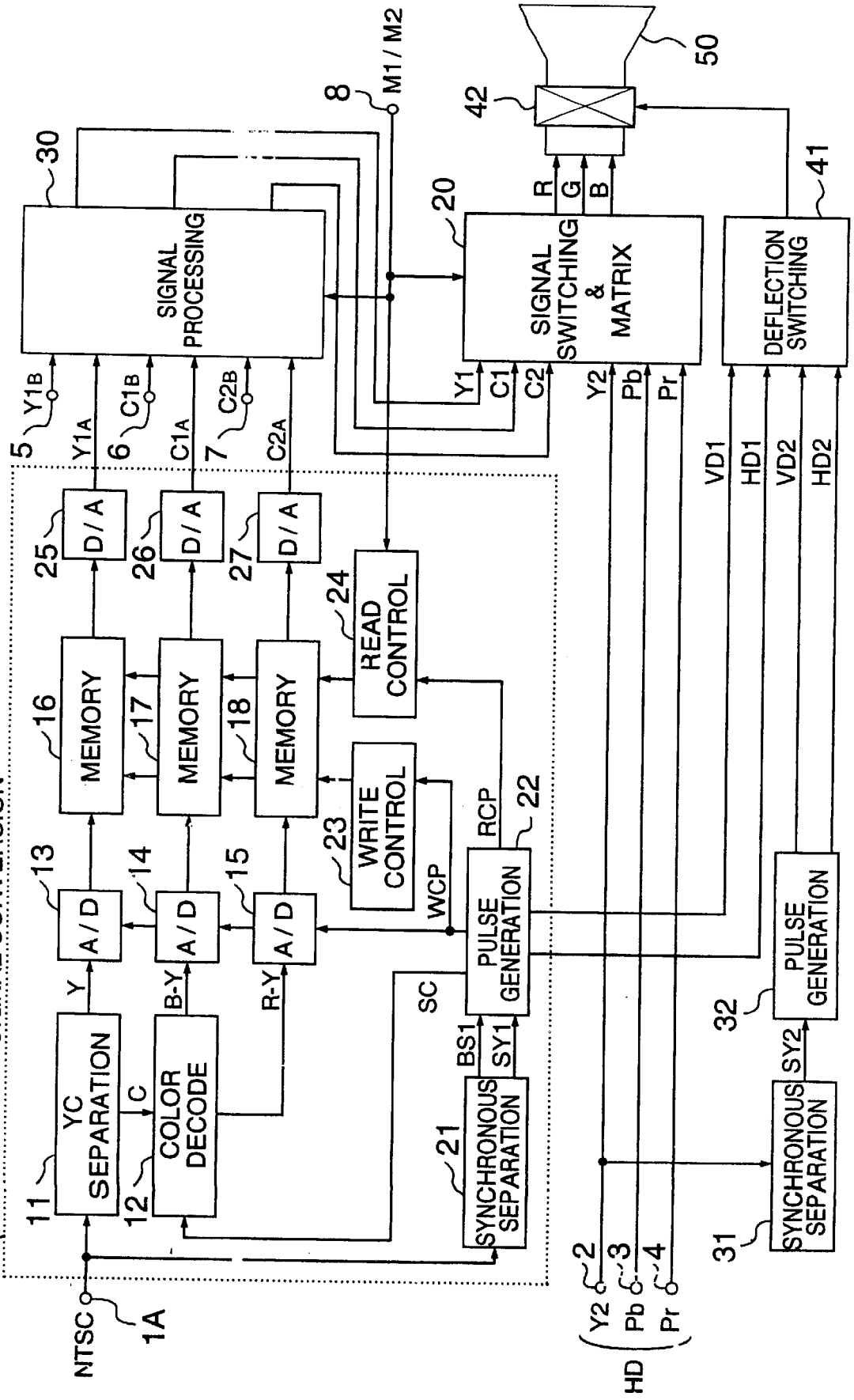
FIG. 1 is a diagram showing an embodiment of a display device for television signals according to the present invention.

FIG. 1 is a diagram showing an embodiment of a device for selectively displaying a video signal of the standard television system and a video signal of the high definition television system according to the present invention.

In FIG. 1, an NTSC signal of composite type (hereinafter referred to as a standard NTSC signal) having the number of scanning lines N1 being 525, a field frequency fV1 of 59.94 Hz, a frame frequency fV1/2 of 29.97 Hz, a horizontal scanning frequency fH1 of 15.73 kHz, an interlace ratio of 2:1 and an aspect ratio of 4:3 and a high definition signal of component type (hereinafter referred to as an HD signal) having the number of scanning lines N2 being 1125, a field frequency fV2 of 60.0 Hz, a frame frequency fV2/2 of 30.0 Hz, a horizontal scanning frequency fH2 of 33.75 kHz, an interlace ratio of 2:1 and an aspect ratio of 16:9 can both be displayed as a video signal of the standard television system and a video signal of the high definition television system, respectively. In FIG. 1, the television signal display device of the present embodiment has an input terminal 1A for the standard NTSC signal of composite type in which a carrier color signal C containing two quadrature-multiplexed color difference signals (R-Y) and (B-Y) is frequency-multiplexed with a brightness signal Y, input terminals 2, 3 and 4 for the HD signal of component type containing a brightness signal Y2 and two color difference signals Pb and Pr of HD signal, input terminals 5, 6 and 7 for component signals (Y1B, C1B, C2B) based on another standard NTSC signal, an input terminal 8 for a mode designation signal M for designating a display mode inputted from a display mode designating means, a signal conversion circuit 10A which converts the number of scanning lines N by once decoding the standard NTSC signal from the terminal 1A to component signals (Y, B-Y, R-Y) and delivers converted components (Y1A, C1A, C2A), a signal switching circuit 20 including a matrix circuit, a signal processing circuit 30, a synchronous separation circuit 31, a pulse generation circuit 32, a deflection switching circuit 41, a deflection system 42 and a display 50 such as a Braun tube.

The mode designation signal M inputted to the mode designation signal input terminal 8 is suitably generated in this television set when a user selects a not shown button for display mode setting provided exteriorly of the television set and depresses the button. In the present invention, three modes in total, for example, are available as display modes, including a monaural display mode (M1) for display of a usual standard television signal of a single channel, a high definition mode (M2) for display of a high definition television signal of a single channel and a stereo display mode (M3) for displaying a stereoscopic image by using standard television signals of a plurality of channels (for example, two channels), and display in any one of these modes can be effected with one television set. The embodiment of FIG. 1 shows a case where of the above modes, either the monaural display mode (M1) or the high definition mode (M2) is displayed.

The signal conversion circuit 10A has a YC separation circuit 11, a color decode circuit 12, A/D conversion circuits 13, 14 and 15, memories 16, 17 and 18, a synchronous separation circuit 21, a pulse generation circuit 22, a write control circuit 23, a read control circuit 24 and D/A conversion circuits 25, 26 and 27.

Operation will be described by first referring to a case where a HD signal of the high definition television system is displayed. Respective component signals Y2, Pb and Pr from the terminals 2, 3 and 4 are supplied to the signal switching circuit 20. When display of a high definition television signal is commanded externally, the respective component signals Y2, Pb and Pr are selectively switched on the basis of a mode designation signal (high definition mode M2) from the terminal 8 and are subjected to a suitable matrix operation to decode three primary color signals R, G and B of the high definition television signal in the signal switching circuit 20.

On the other hand, the synchronous separation circuit 31 separates synchronous information contained in the brightness signal Y2 from the terminal 2 and delivers a synchronizing signal SY2 based on the synchronous information which in turn is supplied to the pulse generation circuit 32. This synchronizing signal SY2 contains a vertical synchronizing signal VS2 of a frequency fV2 of 60.0 Hz and a horizontal synchronizing signal HS2 of a frequency fH2 of 33.75 kHz. A vertical deflection pulse VD2 and a horizontal deflection pulse HD2 are generated on the basis of the synchronizing signal VS2 and the horizontal synchronizing signal HS2 in the pulse generation circuit 32 and delivered therefrom. These deflection pulses VD2 and HD2 are supplied to the deflection switching circuit 41 and are selectively switched on the basis of a display command (M2) for the high definition television signal so as to be delivered to the deflection system 42.

Through the above operation, the three primary color signals of the high definition television signal from the signal switching circuit 20 are supplied to the display 50 and vertical deflection at fV2=60.0 Hz and horizontal deflection at fH2=33.75 kHz are carried out on the basis of the deflection pulses of the high definition television signal from the deflection switching circuit 41 by means of the deflection system 42 to display a color image of high definition television.

Next, operation in a case where the NTSC signal of the standard television system is monaurally displayed.

A standard NTSC signal of composite type from the terminal 1A is supplied to the YC separation circuit 11 and a brightness signal Y and a carrier color signal C which are frequency-multiplexed in the NTSC signal are separated from each other. The separated brightness signal Y is converted into a digital signal in the A/D conversion circuit 13. The separated carrier color signal C is fed to the color decode circuit 12 and two color difference signals (B-Y) and (R-Y) which are quadrature-multiplexed in the carrier color signal C are decoded, separated and delivered. The two color difference signals (B-Y) and (R-Y) are fed to the A/D conversion circuits 14 and 15, respectively, so as to be converted into digital signals. The standard NTSC signal from the terminal 1A is also supplied to the synchronous separation circuit 21, synchronous information and burst information of a color sub-carrier which are contained in the NTSC signal are separated from each other in the synchronous separation circuit 21, and a synchronizing signal SY1 based on the synchronous information and a burst signal BS1 based on the burst information are delivered and fed to the pulse generation circuit 22. Contained in the synchronizing signal SY1 are a vertical synchronizing signal VS1 having a frequency fV1 of 59.94 Hz and a horizontal synchronizing signal HS1 having a frequency fH1 of 15.73 kHz. The burst signal BS1 has a frequency fSC of 3.58 MHz equal to a color sub-carrier frequency.

The pulse generation circuit 22 has a first PLL circuit, a second PLL circuit and a third PLL circuit and a write clock signal WCP having a frequency fW of, for example, 4×fSC= 14.32 MHz is first generated on the basis of the burst signal BS1 by means of the first PLL circuit. Since the relation of fW=910×fH1 (=14.32 MHz) stands, the write clock signal WCP may also be generated on the basis of the horizontal synchronizing signal HS1 of frequency fH1. In the first PLL circuit, a sequential color sub-carrier signal SC having the same frequency as the burst signal BS1 is also generated. The color sub-carrier signal SC is supplied to the color decode circuit 12 and is used for decoding the carrier color signal C.

Further, a double rate vertical synchronizing signal VD1 having a frequency fV of, for example, 2×fV1=119.88 Hz and a double rate horizontal synchronizing signal HD1 having a frequency fH of, for example, (1051/4)×fV=31.50 kHz are generated on the basis of the vertical synchronizing signal VS1 by means of the second PLL circuit of the pulse generation circuit 22. Further, a read clock signal RCP having a frequency fR of, for example, 910×fH=28.66 MHz is generated on the basis of the double rate horizontal synchronizing signal HD1 by means of the third PLL circuit of the pulse generation circuit 22.

Since the relation of fR=(1051/525)×fW (=28.66 MHz), the relation of fR=(4×1051/525)×fSC (=28.66 MHz), the relation of fR=(910×1051/525)×fH1 (=28.66 MHz) or the relation of fR=(1051×455)×fV1 (=28.66 MHz) stands, the read clock signal RCP may also be generated on the basis of the write clock signal WCP of frequency fW, the burst signal BS1 (or color sub-carrier signal SC) of frequency fSC, the horizontal synchronizing signal HS1 of frequency fH1 or the vertical synchronizing signal VS1 of frequency fV1. The double rate vertical synchronizing signal VD1 and the double rate horizontal synchronizing signal HD1 are delivered as a vertical deflection pulse and a horizontal deflection pulse for standard television signal display, respectively, and are supplied to the deflection switching circuit 41.

Firstly, the write clock WCP generated in the pulse generation circuit 22 is supplied as a clock for A/D conversion to the A/D conversion circuits 13, 14 and 15 so that the analog brightness signal Y and two color difference signals (B-Y) and (R-Y) may be converted into digital signals. The write clock WCP is also fed to the write control circuit 23, so that write to each of the memories 16, 17 and 18 can be controlled on the basis of the write clock WCP and digitized standard NTSC signals from the A/D conversion circuits 13, 14 and 15 can be written sequentially to the memories 16, 17 and 18.

Typically, since the color difference signals (B-Y) and (R-Y) have occupation bands which are narrower than an occupation band of the brightness signal Y (for example, being 1/4), the clock for A/D conversion of the color difference signals (B-Y) and (R-Y) and the clock for write to the memories may be formed such that they are generated at a frequency lower than that of the brightness signal Y (for example, being fW/4) in accordance with a band ratio. For simplification of explanation, in this embodiment, a case is described where the clocks WCP used are of the same frequency.

Write to the memories 16, 17 and 18 is carried out in a unit of line every field of the standard NTSC signal. In order to control the write operation effected in a unit of line every field, the horizontal synchronizing signal HS1 and vertical synchronizing signal VS1 from the pulse generation circuit 22 are suitably fed to the write control circuit 23.

Next, the read clock RCP generated in the pulse generation circuit 22 is fed to the read control circuit 24, so that read of the brightness signal Y and color difference signals (B-Y) and (R-Y) from the memories 16, 17 and 18 can be controlled on the basis of the read clock RCP and the standard NTSC signals written to the respective memories can sequentially be read in a unit of line every field. In order to control the read operation effected in a unit of line every field, the double rate horizontal synchronizing signal HD1 and double rate vertical synchronizing signal VD1 from the pulse generation circuit 22 are suitably supplied to the read control circuit 24. The read control circuit 24 is also supplied with a mode designation signal M from the terminal 8 to switch the read control.

The ratio between frequencies of the write clock WCP and read clock RCP is given by the following equation (1):

$$fR/fW=1051/525\approx 2.0 \qquad (1).$$

Accordingly, signals which are obtained by nearly 1/2 compressing the original standard NTSC signals on time axis in a unit of line (hereinafter referred to as double rate NTSC signals) are delivered out of the memories 16, 17 and 18 and a horizontal scanning frequency for these signals is given by the frequency fH=(1051/525)×fH1=31.50 kHz of the double rate horizontal synchronizing signal HD1. Therefore, the ratio to the original horizontal scanning frequency fH1 is given by the following equation (2), amounting up to a value which is nearly two:

$$fH/fH1=1051/525\approx 2.0 \qquad (2).$$

Digitized double rate NTSC signals read and delivered out of the respective memories 16, 17 and 18 are converted into analog signals in the D/A conversion circuits 25, 26 and 27, respectively, an output from the memory 16 based on the brightness signal Y is supplied as a double rate brightness signal Y1A to the signal processing circuit 30, and outputs from the memories 17 and 18 based on the two color difference signals (B-Y) and (R-Y) are supplied as double rate color signals C1A and C2A to the signal processing circuit 30.

The signal processing circuit 30 is supplied with a mode designation signal M from the terminal 8 and the signal processing is suitably switched on the basis of the mode designation signal M. When the aforementioned monaural display mode (M1) is designated, respective component signals (Y1A, C1A, C2A) from the D/A conversion circuits 25, 26 and 27 are supplied as they are (without subjected to any special processing) in the form of (Y1, C1, C2), respectively, to the signal switching circuit 20. Namely, in this monaural display mode (M1), Y1=Y1A, C1=C1A and C2=C2A are processed in the signal processing circuit 30 and delivered therefrom.

When the standard television signal is externally commanded to be monaurally displayed, the respective component signals Y1, C1 and C2 of the aforementioned double rate NTSC signal based on the original standard television signal are selectively switched and are subjected to a suitable matrix operation by means of the signal switching circuit 20 so that three primary color signals R, G and B based on that double rate NTSC signal may be decoded.

On the other hand, the vertical deflection pulse VD1 and horizontal deflection pulse HD1 from the pulse generation circuit 22 are selectively switched on the basis of the display command (M1) for the standard television signal in the deflection switching circuit 41 and delivered to the deflection system 42.

Through the above operation, double rate three primary color signals based on the original standard television signal and delivered out of the signal switching circuit 20 are supplied to the display 50 and in the deflection system 42, they undergo vertical deflection at fV=119.88 Hz and horizontal deflection at fH=31.50 kHz on the basis of deflection pulses from the deflection switching circuit 41, so that a color image of standard television can be displayed at a double rate.

Reading signals from the memories 16, 17 and 18, which is the key to the present invention, is carried out by a method as will be detailed hereinafter with reference to FIGS. 2 and 3.

Figure 2:
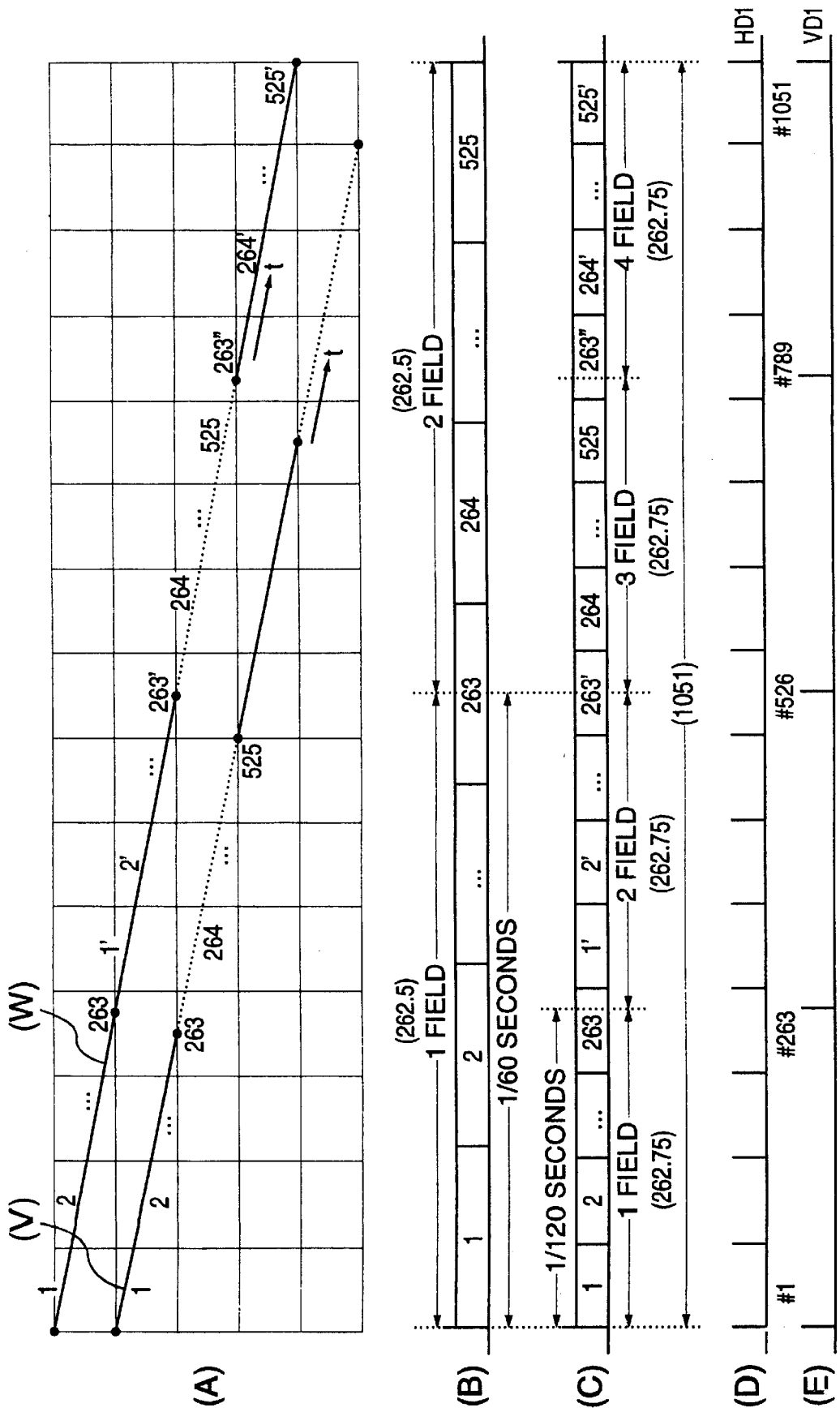
FIG. 2 is a diagram showing waveforms and timings of a television signal in FIG. 1.
Figure 3A:
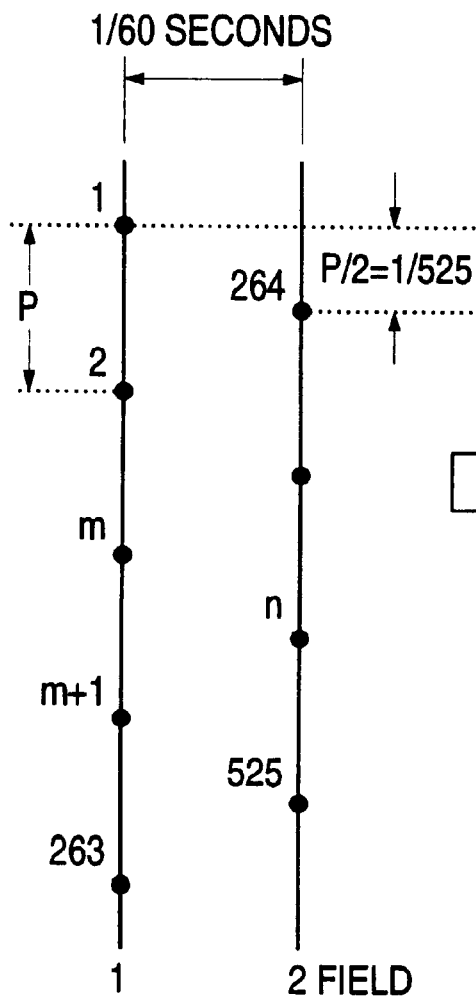
FIG. 3A and FIG. 3B are diagrams showing scanning line structures for the television signal in FIG. 1.
Figure 3B:
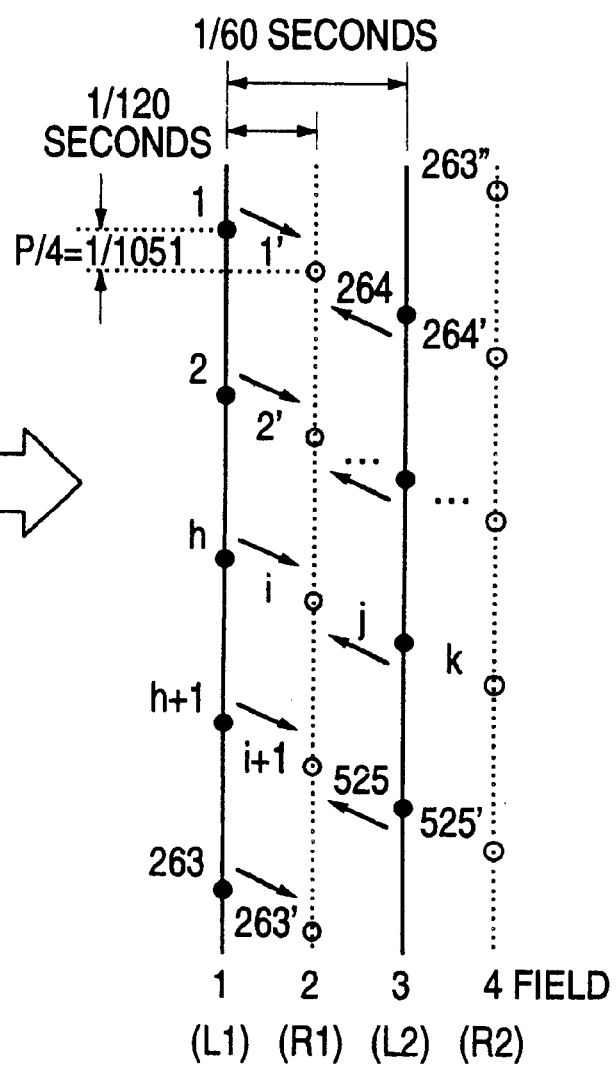

FIG. 2 is a diagram showing timings for reading signals from the memories in the monaural display mode M1 of the present invention and FIGS. 3A and 3B are diagrams showing scanning line structures of a double rate NTSC signal obtained through the signal reading which are different for different fields. Numerals represent line numbers in FIG. 2 and FIGS. 3A and 3B, the state of scanning of the standard NTSC signal (composed of the brightness signal Y and two color difference signals (B-Y) and (R-Y)) is shown at (V) of (A) in FIG. 2 and in FIG. 3A, and a waveform diagram of the standard NTSC signal is shown at (B) in FIG. 2. The state of scanning of the double rate NTSC signal (composed of the brightness signal Y1A and two color signals C1A and C2A) according to the present invention is also shown at (W) of (A) in FIG. 2 and in FIG. 3B and a waveform diagram of the double rate NTSC signal is shown at (C) in FIG. 2.

As shown at (B) in FIG. 2 and in FIG. 3A, the standard NTSC signal contains N1=525 scanning lines within a period of one frame (1/30 seconds) and 262.5 scanning lines within a period of one field (1/60 seconds). Namely, in the standard NTSC signal, 1st to 263rd lines are contained in a first field and 263rd to 525th lines are contained in a succeeding second field.

Contrary to this, in the double rate NTSC signal having the field period converted into 1/2 of that of the standard NTSC signal (1/120 seconds), 262.75 scanning lines are contained within a period of one field of 1/120 seconds and N=262.75×4=1051 scanning lines are contained within a period of four fields (that is, the period of one frame of the standard NTSC signal), as shown at (C) in FIG. 2 and in FIG. 3B.

More particularly, as shown at (C) in FIG. 2, within the period of the first field of the double rate NTSC signal, signals of 1st to 263rd lines in the first field of the standard NTSC signal are read out of the memories at a double rate so as to be delivered as signals of lines 1 to 263 (consecutive numbers #1 to #263) and within the period of a succeeding next second field, the signals of 1st to 263rd lines in the first field of the standard NTSC signal are again read so as to be delivered as signals of lines 1' to 263' (consecutive numbers #264 to #526). Within the period of a next third field, signals of 264th to 525th lines in the second field of the standard NTSC signal are read out of the memories at the double rate so as to be delivered as signals of lines 264 to 525 (consecutive numbers #527 to #788) and within the period of a succeeding next fourth field, the signals of 264th to 525th lines in the second field of the standard NTSC signal are again read so as to be delivered as signals of lines 264' to 525' (consecutive numbers #790 to #1051).

At that time, at the boundary between the third and fourth fields, an arbitrary signal (for example, a signal of 263rd line of the standard NTSC signal) is read suitably so as to be delivered as a signal of line 263" (consecutive number #789). Since any of the boundary between the first and second fields, the boundary between the second and third fields, the boundary between the third and fourth fields and the boundary of the fourth field and the first field of the next frame corresponds to the invalid period for blanking in the case of image display, the so-called blanking period in which no signal is delivered may be formed by temporarily stopping the reading operation of signals from the memories over a period of one line or a plurality of lines before and after the boundary.

The reading operation from the respective memories 16, 17 and 18 effected in a unit of line and the reading operation effected for the fields are controlled on the basis of the double rate horizontal synchronizing signal HD1 and double rate vertical synchronizing signal VD1, which are generated by the pulse generation circuit 22, in accordance with the signal (M1) for designating the monaural display mode from the terminal 8, as described previously and therefore, a desired double rate NTSC signal as shown at (C) in FIG. 2 can steadily be obtained. Examples of waveforms of the double rate horizontal synchronizing signal HD1 and double rate vertical synchronizing signal VD1 are shown at (D) and (E) in FIG. 2, respectively.

In the above embodiment, the double rate vertical synchronizing signal VD1 has a fixed period corresponding to 262.75 lines in any of the first to fourth fields and has a fixed period (TF) corresponding to 262.75×4=1051 lines for one frame, as shown at (E).

With the above structure, relations (3) as below generally stand among the horizontal scanning frequency fH, frame vertical scanning frequency fF (=1/TF) and field vertical scanning frequency fV of the double rate signal obtained in the present invention:

$$fH = N \times fF$$

$$fF = fV1/2$$

$$fV = 4 \times fF = 2 \times fV1 \qquad (3)$$

where N is the number of scanning lines.

When the double rate signal is deflected and scanned on the basis of the above double rate horizontal synchronizing signal HD1 and double rate vertical synchronizing signal VD1, a scanning line structure as shown in FIG. 3B is obtained.

Generally, as shown in FIG. 3A, the standard NTSC signal has such a phase relation that an n-th line in the second field is 2:1 interlaced between an m-th line and an (m+1)th line in the first field. In other words, given that the scanning line interval in a field is P, the phase relation is such that the second field is P/2 displaced (1/2 line offset) in the vertical direction in relation to the first field.

In contrast, as shown in FIG. 3B, the aforementioned double rate NTSC signal is displayed in such a phase relation that a signal of the m-th line in the first field of the standard NTSC signal is delivered as a signal of an h-th line in the first field and a signal of an i-th line in the second field of the double rate NTSC signal, a signal of the n-th line in the second field of the standard NTSC signal is delivered as a signal of a j-th line in the third field and a signal of a k-th line in the fourth field of the double rate NTSC signal, the j-th line in the third field is 2:1 interlaced between the h-th line and an (h+1)-th line in the first field of the double rate NTSC signal, the k-th line in the fourth field is 2:1 interlaced between the i-th line and an (i+1)-th line in the second field of the double rate NTSC signal, and the second and fourth fields are displaced by 1/4 of the scanning line interval (1/4 line offset) in the vertical direction in relation to the first and third fields, respectively.

Incidentally, since the scanning line structure of the standard NTSC signal has an interlaced scanning structure which ends in two fields 1/60 seconds spaced apart and subject to 1/2 line offset in the vertical direction as shown in FIG. 3A, the scanning line interval in the vertical direction within a frame is P/2=1/525.

Contrary to this, the scanning line structure of the double rate NTSC signal subject to the scanning conversion as above has a scanning structure which ends in four fields every 1/120 seconds, the four fields being spaced apart by 1/120 seconds and subject to 1/4 line offset as shown in FIG. 3B and hence, the scanning line interval in the vertical direction within a frame is P/4=1/1051, indicating that the scanning line interval is compressed to 1/2 of that of the standard NTSC signal to permit display at a doubled density. Hereinafter, this is called a double-density display.

The scanning line conversion based on the present invention brings about such an operational effect that fields are interpolated in the time axis direction to double the number of fields per frame and besides, scanning lines are also interpolated in the vertical direction among fields to double the number of lines per frame. In the present invention, as far as accomplishment of the above operational effect is concerned, a signal of the (interpolated) second or fourth field indicated by dotted line in FIG. 3B, for example, can also be obtained by carrying out the processing in which as indicated by arrow in the Figure, a signal of (for example, line 1') in the second field is interpolated in the form of a signal as a result of addition and average of a signal of (for example, line 1) in the first field and a signal of (for example, line 264) in the third field or by carrying out the processing in which a signal of (for example, line 264') in the fourth field is similarly interpolated in the form of a signal as a result of addition and average of a signal of (for example, line 264) in the third field and a signal of (for example, line 2) in the first field of the next frame.

This method brings about an operation for restricting the band in the vertical direction to thereby ensure reduction of disturbance such as line flicker concomitant with aliasing as will be described hereinafter and is effective for image quality improvement. The interpolation processing as above may be conducted in, for example, the aforementioned signal processing circuit 30, though not shown, or may be effected by means of signal processing circuits for digital field interpolation processing of the respective component signals which are interposed between the memory 16 and D/A conversion circuit 25, between the memory 17 and D/A conversion circuit 26 and between the memory 18 and D/A conversion circuit 27.

Figure 4:
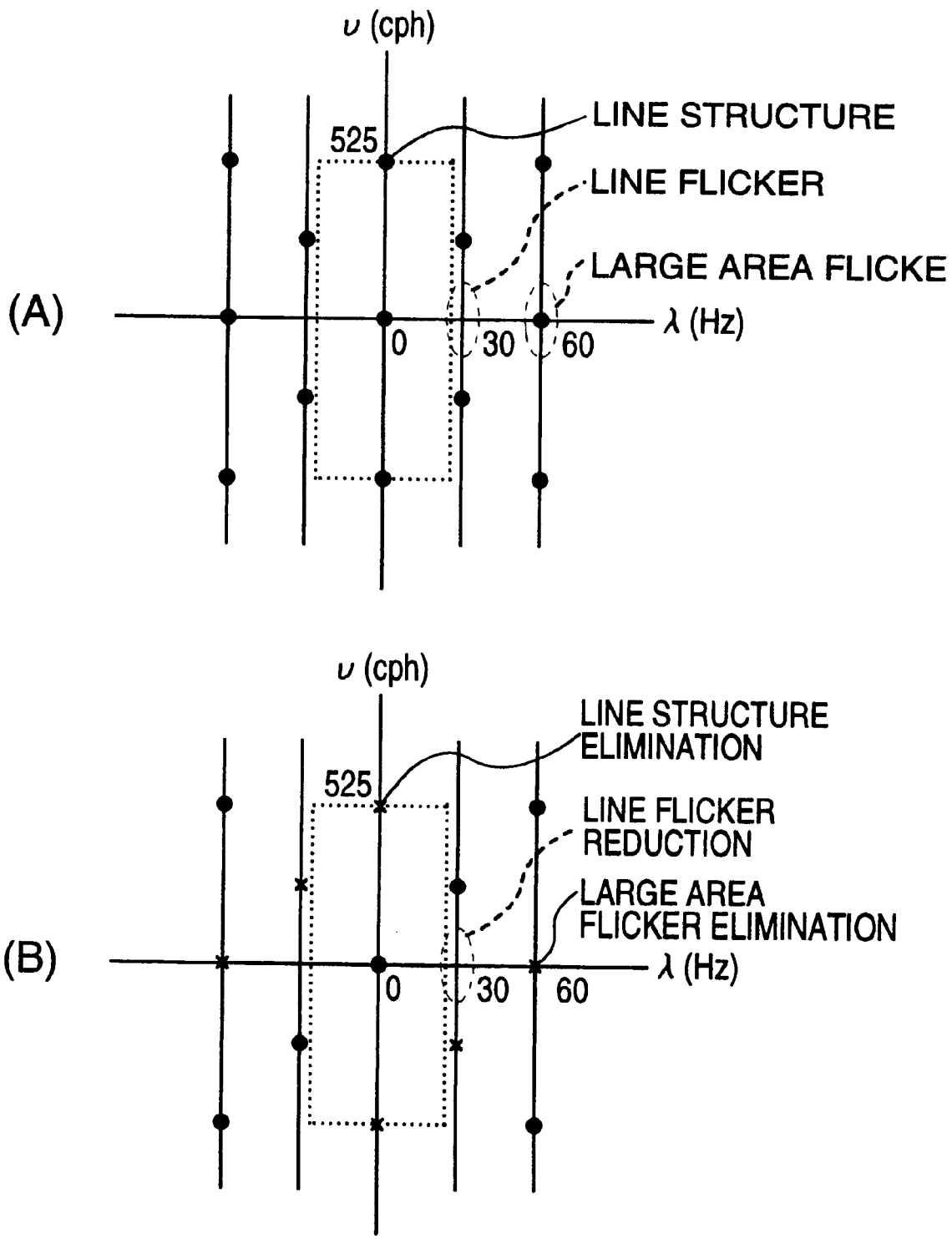
FIG. 4 is a diagram two-dimensional spectra of the television signal in FIG. 1.

The difference in image quality between the standard NTSC signal and the double rate NTSC signal obtained by the present invention is shown by comparing two-dimensional spectra in FIG. 4. In FIG. 4, abscissa represents time frequency (λ), ordinate represents vertical spatial frequency (v), and an area enclosed by dotted line indicates an area in which display by a large-sized new television receiver of high brightness and high definition in, for example, high definition television is effected. Shown at (A) in FIG. 4 is a two-dimensional spectrum of the standard NTSC signal and shown at (B) in FIG. 4 is a two-dimensional spectrum of the double rate NTSC signal. It will be seen from the two-dimensional spectra that in the standard NTSC signal, various kinds of image quality deterioration take place including a line structure (disturbance which makes the scanning line structure visible) due to a spectrum developing at (λ, v)=(0, 525) and a flicker disturbance (such as a disturbance that a flicker occurs at a large area) developing at (60, 0) as well as an aliasing disturbance (line flicker) developing near (30, 0).

In contrast, in the double rate NTSC signal, the number of scanning lines is increased to extinguish the spectrum at (0,

525), with the result that the aforementioned line structure can be eliminated and the image quality improving effect of making the scanning line unnoticeable and making the image lustrous to improve the mass nature. Because of extinction of the spectrum at (60, 0), the aforementioned flicker disturbance can be eliminated and consequently, flicker can be removed to permit a visually stable image to be obtained. Further, by the band restricting effect in the vertical direction attributable to the aforementioned scanning line interpolation, the aliasing disturbance near (30, 0) can also be reduced and the line flicker can be suppressed to attain the image quality improving effect extensively as a whole.

In addition, as is clear from the operational description of FIG. 1, even when the standard television signal is displayed monaurally, substantially the same deflection as that in the case of display of the high definition television signal can be effected, thus making the deflection system easily usable in common to the standard television signal and the high definition television signal to ensure the reduction of cost of the device.

Figure 5A:
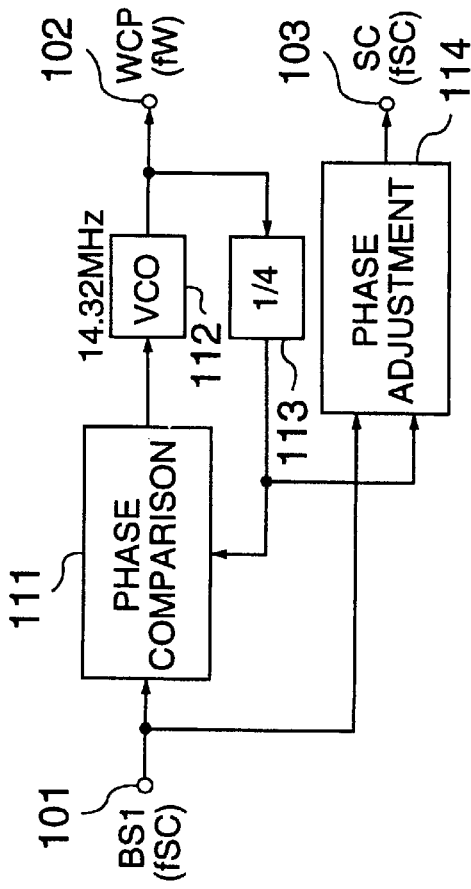
FIG. 5A and FIG. 5B are diagrams showing a first embodiment of a PLL circuit according to the present invention.
Figure 5B:
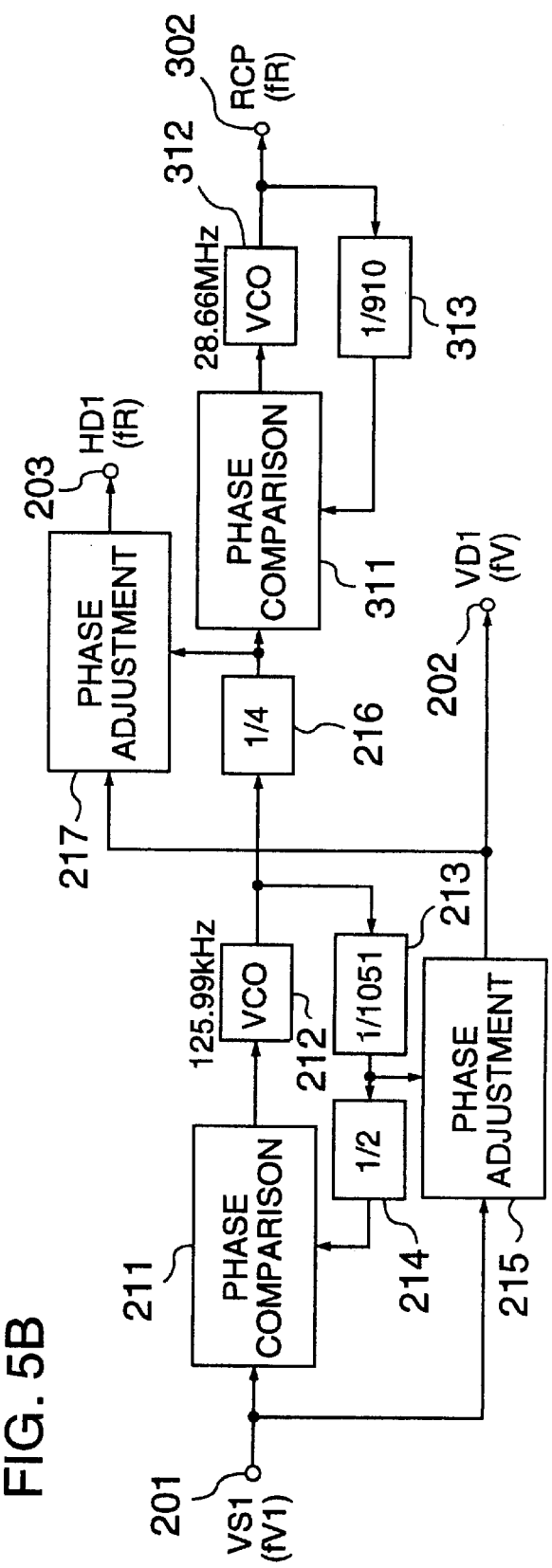

Next, an embodiment of the PLL circuit used in the pulse generation circuit 22 is shown in FIGS. 5A and 5B.

FIG. 5A shows an embodiment of the first PLL circuit and FIG. 5B shows an embodiment of the second and third PLL circuits.

Referring to FIG. 5A, the first PLL circuit has an input terminal 101 for the burst signal BS1, an output terminal 102 for the write clock signal WCP, an output terminal 103 for the color sub-carrier signal SC, a phase comparator 111, a first voltage controlled oscillator (VCO) 112 which oscillates at 14.32 MHz, a frequency divider 113 and a phase adjuster 114. An output from the oscillator 112 is 1/4 frequency-divided by means of the frequency divider 113 and phase-compared with the burst signal BS1 from the terminal 101 by means of the phase comparator 111. The oscillator 112 is voltage-controlled by an output from the phase comparator 111, so that a write clock signal WCP having a frequency fW of 4×fSC and phase-locked to the burst signal BS1 is generated from the oscillator 112 and delivered to the terminal 102. A continuous signal having a frequency of fSC is obtained from the frequency divider 113 and this output is phase-locked to the burst signal BS1 from the terminal 101 and suitably adjusted in phase by means of the phase adjuster 114 and is delivered as a color sub-carrier signal SC to the terminal 103.

FIG. 5B shows a case where the second PLL circuit constructed of a second voltage controlled oscillator 212 is connected in cascade with the third PLL circuit constructed of a third voltage controlled oscillator 312. Firstly, an output from the oscillator 212 which oscillates at a frequency of 125.99 kHz is 1/1051 frequency-divided by a frequency divider 213 and an output therefrom is further 1/2 frequency-divided by means of a frequency divider 214 and is compared in phase with the vertical synchronizing signal VS1 from a terminal 201 by means of a phase comparator 211. The oscillator 212 is voltage-controlled by an output from the phase comparator 211, with the result that a signal having a frequency of 4×fH and phase-locked to the vertical synchronizing signal VS1 is generated from the oscillator 212. Accordingly, a signal having a frequency of 4×fH/1051=fV, that is, the aforementioned double rate vertical synchronizing signal VD1 is generated from the frequency divider 213 and an output therefrom is suitably adjusted in phase on the basis of the vertical synchronizing signal VS1 from the terminal 201 by means of a phase adjuster 215 and then delivered to a terminal 202. On the other hand, an output from the oscillator 212 is 1/4 frequency-divided by a frequency divider 216. Accordingly, a signal having a frequency fH, that is, the aforementioned double rate horizontal synchronizing signal HD1 is generated from the frequency divider 216 and this output is suitably adjusted in phase on the basis of the double rate vertical synchronizing signal VD1 from the phase adjuster 215 by means of a phase adjuster 217 and then delivered to a terminal 203.

Subsequently, an output from the oscillator 312 which oscillates at a frequency of 28.66 MHz is 1/910 frequency-divided by a frequency divider 313 and compared in phased with the output of the frequency divider 216 by means of a phase comparator 311. The oscillator 312 is voltage-controlled by an output of the phase comparator 311 and consequently, a read clock signal RCP having a frequency fR of 910×fH and phased locked to the double rate horizontal synchronizing signal HD1 is generated from the oscillator 312 and delivered to a terminal 302.

Incidentally, in the above embodiment, the number of scanning lines N of the double rate signal has been described as being fixed to N=1051 but the present invention is not limited thereto. In the present invention, the number of scanning lines N of the double rate signal may be a desired integer which is nearly twice the number of scanning lines N1 of the standard signal and preferably, the number of scanning lines N may be odd. For example, in the embodiment of FIG. 1, the NTSC signal of N1=525 may be determined to have its odd numerical value being nearly twice the N1, amounting to N=1125 which is the same odd number as the number of scanning lines N2 of the high definition television signal, and may be displayed after being converted to a double rate signal of 1125 lines per frame. In this case, the scanning line increases from 1051 to 1125 and display may be effected after an increment of 74 lines is interpolated for the blanking period of no signal (for example, vertical blanking period). While the vertical scanning frequency fV obtained in this case does not change from the above so as to be given by fV=119.88 Hz, the horizontal scanning frequency fH increases to fH=33.72 kHz pursuant to the above equation (3) so as to be substantially equal to the horizontal scanning frequency fH2=33.75 kHz of the high definition television signal, making it possible to further improve compatibility of one value with the other.

Figure 6A:
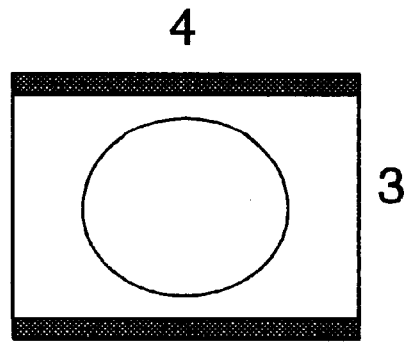
FIGS. 6A to 6D are diagrams showing a first embodiment of a display method according to the present invention.
Figure 6B:
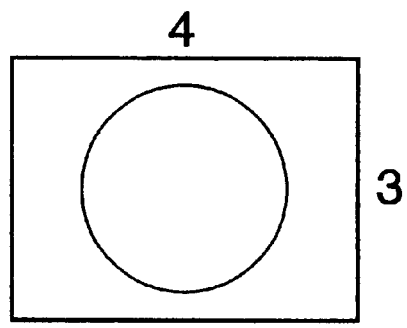

When the double rate signal thus converted from the original signal of the aspect ratio 4:3 to have the number of scanning lines which is twice or more that of the original signal is displayed on the display 50 of the aspect ratio 4:3, upper and lower portions of the screen are cut in accordance with the increment and display of a figure is distorted vertically as shown in FIG. 6A. In order to eliminate this distortion, deflection for upward and downward vertical enlargement from the center of the screen (so-called over scan), for example, is effected by means of the deflection system 42 so that an image of high fidelity removed of figure distortion as shown in FIG. 6B may be reproduced. Alternatively, instead of interpolating the 74 lines for the blanking period, the line interpolation processing in which enlargement in the vertical direction is effected by the signal processing carried out through the memories may be conducted not only to eliminate the figure distortion but also to prevent the vertical resolution from decreasing.

Figure 6C:
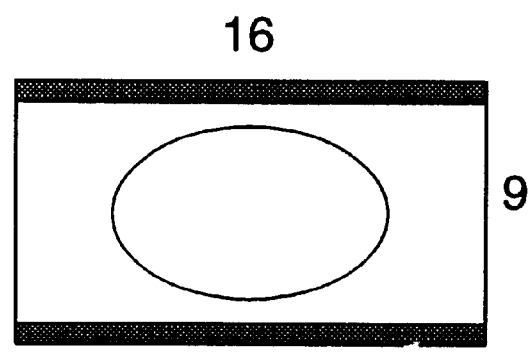
Figure 6D:
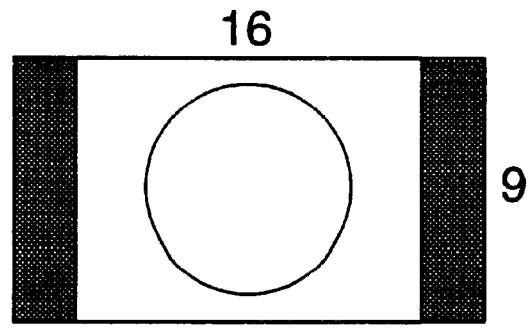

When the double rate signal is displayed on a display 50 having an aspect ratio of 16:9, upper and lower portions of the screen are similarly cut and display of a figure is greatly distorted in the left and right directions as shown in FIG. 6C. In order to eliminate the upper and lower image absent portions (blanking portions), the deflection operation or signal processing for enlargement in the vertical direction is obviously effective. Alternatively, for example, by performing deflection for upward and downward enlargement and left and right horizontal reduction from the center of the screen by means of the deflection system 42, the upper and lower image absent portions can be eliminated and the distortion in both of the vertical and the horizontal directions can be mitigated as shown in FIG. 6D. Alternatively, by performing the line interpolation processing for enlargement in the vertical direction in accordance with the signal processing through the memories and concurrently performing the time axis processing for compression in the horizontal direction, not only the figure distortion can be eliminated but also reduction in vertical resolution can be prevented.

Figure 7A:
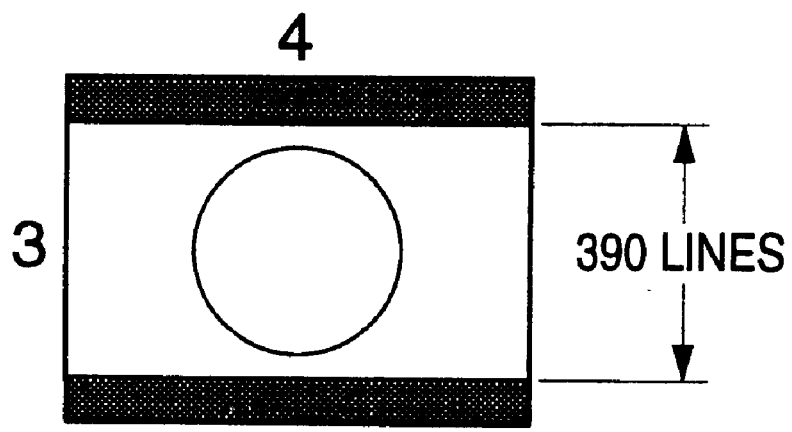
FIG. 7A and FIG. 7B are diagrams showing another embodiment of the display method according to the present invention.
Figure 7B:
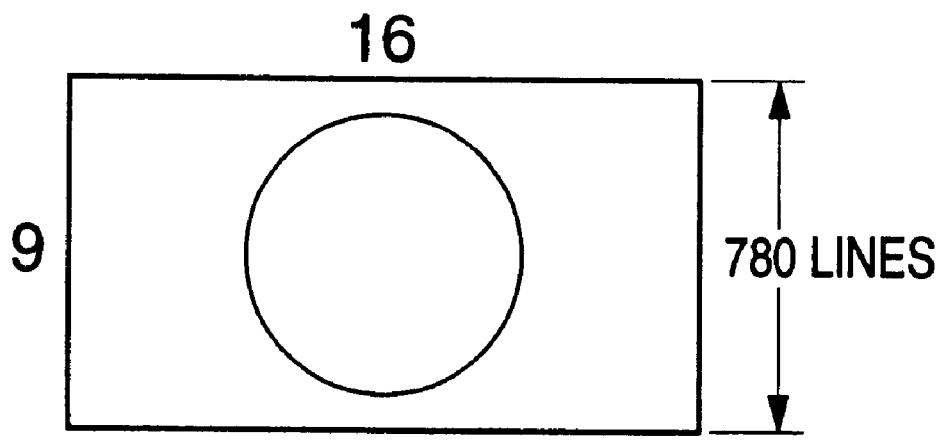

Further, the present invention can obviously be applied to a case where a so-called letter box type wide image having an aspect ratio of 16:9, which has been studied currently in the ED system and EDII system conformable to the standard television system of aspect ratio 4:3, is displayed as shown in FIG. 7A. More specifically, the number of lines N0 of an effective portion (excluding an image absent portion) of a letter box type wide image in the ED system and EDII system having the number of scanning lines N1 of 525 is given by 525×3/4≈390 and by applying the present invention to this, display can be effected with the number of lines of the effective portion doubled, amounting to about 780. By applying the aforementioned vertical deflection enlargement based on the over scan to this, a 16:9 wide screen removed of display of image absent portion can be obtained as shown in FIG. 7B. Alternatively, by further performing the line interpolation processing for enlargement in the vertical direction in accordance with the aforementioned signal processing and performing, for example, the processing as disclosed in the previously-described JP-A-4-334289 in which one line is interpolated every three lines so as to be converted into four lines, 4/3 enlargement in the vertical direction can be accomplished and therefore, in this case, display can be permitted with 780×4/3≈1040 lines.

Figure 8:
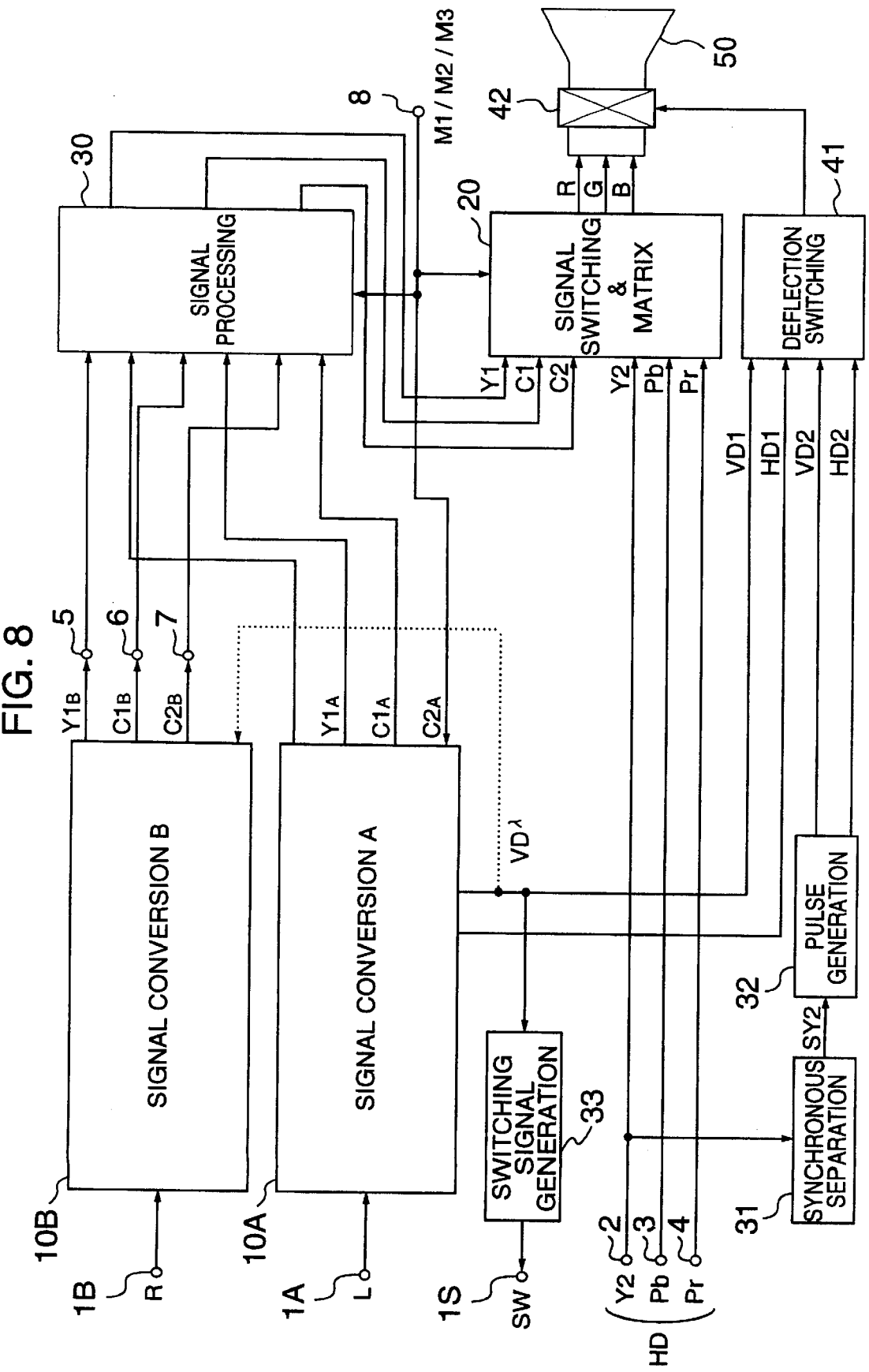
FIG. 8 is a diagram showing another embodiment of the display device for television signals according to the present invention.
Figure 9:
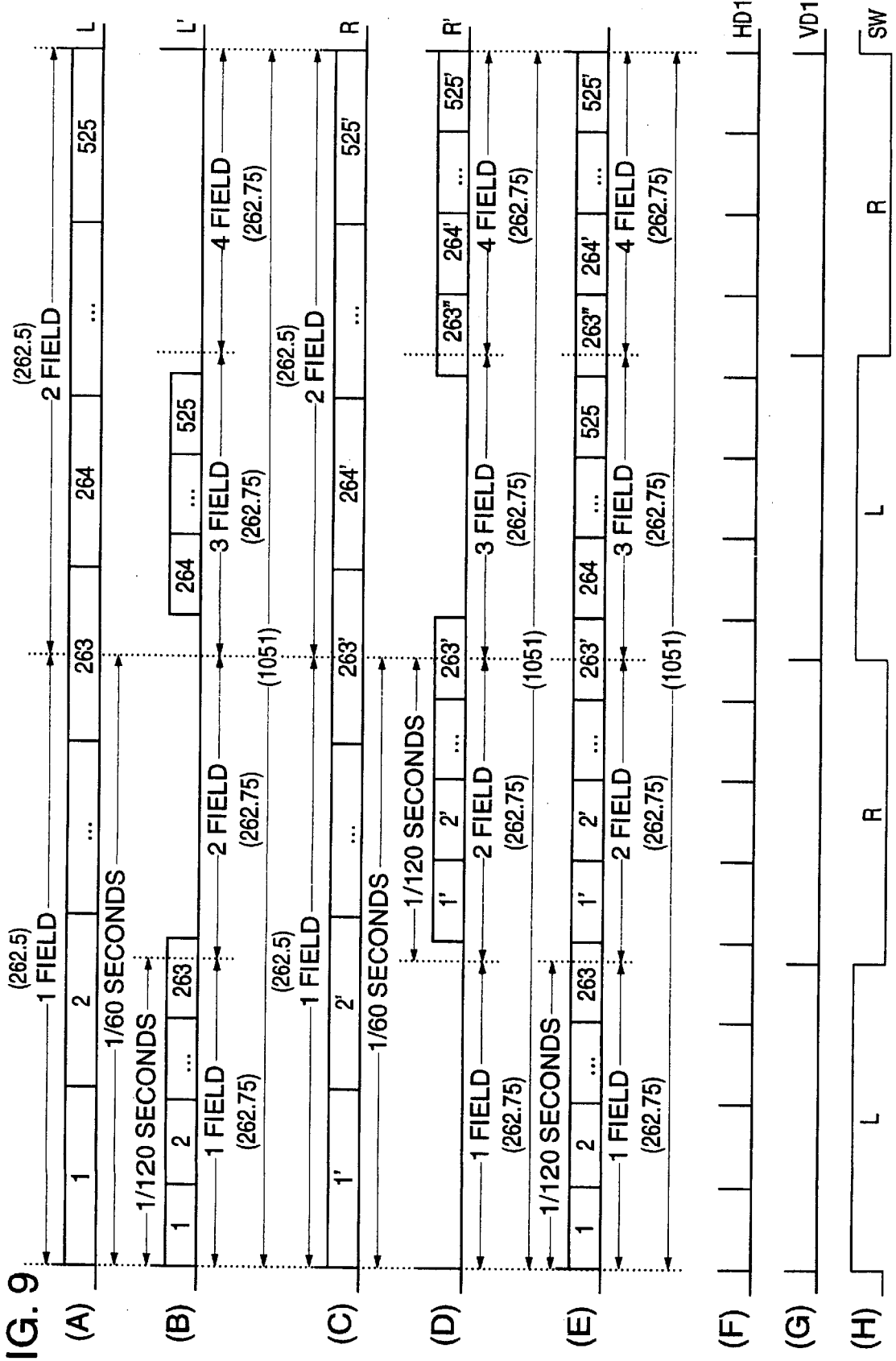
FIG. 9 is a diagram showing waveforms and timings of a television signal in FIG. 8.

Next, an embodiment of a device for selectively switching and displaying a video signal of stereoscopic television system and a video signal of high definition television system is shown in FIG. 8 and waveforms and timings at essential parts are shown in FIG. 9.

The embodiment of FIG. 8 is so constructed that in addition to the previously-described monaural display mode (M1) and high definition mode (M2), display can also be done in a stereo display mode (M3).

In FIG. 8, some components can be common to the embodiment of FIG. 1 and identical parts are designated by identical reference numerals. In the embodiment of FIG. 8, video information signals of two channels conformable to the standard television NTSC are inputted, as a stereoscopic television signal, to terminals 1A and 1B, respectively. Here, a signal L (at (A) in FIG. 9) based on left eye image information is inputted, as a video information signal of a first channel of the stereoscopic television signal, to the terminal 1A and a signal R (at (C) in FIG. 9) based on right eye image information is inputted, as a video information signal of a second channel, to the terminal 1B, the two signals being synchronous with each other at a field period (1/60 seconds).

A signal conversion circuit 10A is the same signal conversion circuit as that described previously with reference to FIG. 1 and operates to convert the signal L from the terminal 1A into a double rate signal L' (at (B) in FIG. 9) having a half field period (1/120 seconds). A signal conversion circuit 10B also has the same construction as the signal conversion circuit 10A and operates to convert the signal R from the terminal 1B into a double rate signal R' (at (D) in FIG. 9) having a half field period (1/120 seconds).

For further detail, the operation of FIG. 8 will be described with reference to a timing chart of FIG. 9. Firstly, the left eye image information signal L from the terminal 1A is converted into the double rate signal L' of the half field period (1/120 seconds) in the signal conversion circuit 10A and as shown at (B) in FIG. 9, during the period of a first field of the double rate signal L', signals (L1) of 1st to 263rd lines in a first field of the signal L are delivered and during the period of a next second field of the double rate signal L', the delivery of the signal is temporarily stopped and a blanking signal corresponding to an image absent portion is delivered. Further, during the period of a next third field of the double rate signal L', signals (L2) of 264th to 525th lines in the second field of the signal L are delivered and during the period of a next fourth field of the double rate signal L', the delivery of the signal is again stopped temporarily and the blanking signal corresponding to of the image absent portion is delivered. In other words, in the odd fields (first and third fields) of the double rate signal L', the left eye image information signal L is delivered every field in the form of the signals L1 and L2 each having the compressed half period and in the even fields (second and fourth fields) of the double rate signal L', the blanking signal is delivered.

Delivery of signals in the odd fields (first and third fields) of the double rate signal L' is controlled on the basis of write and read of the respective component signals to and from the memories 16, 17 and 18 controlled by the write control circuit 23 and read control circuit 24 in the signal conversion circuit 10A as described in connection with FIG. 1. Contrary to this, delivery of the blanking signal in the even fields (second and fourth fields) of the double rate signal L' is carried out by temporarily stopping read of the read control circuit 24 on the basis of the stereo display mode designation signal (M3) supplied from the terminal 8.

The above signal conversion is effected for each component signal of the left eye image information signal L, so that component signals (Y1A, C1A, C2A) subject to double rate conversion are delivered out of the signal conversion circuit 10A and supplied to the signal processing circuit 30.

Next, the right eye image information signal R from the terminal 1B is converted into the double rate signal R' having a half field period (1/120 seconds) by means of the signal conversion circuit 10B and as shown at (D) in FIG. 9, during the period of a first field of the double rate signal R', delivery of the signal is now stopped temporarily and the blanking signal corresponding to the image absent portion is delivered and during the period of a next second field of the double rate signal R', signals (R1) of 1'st to 263'rd lines in the first field of the signal R are delivered. Further, during the period of a next third field of the double rate signal R', delivery of the signal is again stopped and the blanking signal corresponding to the image absent portion is delivered and during the period of a next fourth field of the double rate signal R', signals (R2) of 264'th to 525'th lines in the second field of the signal R are delivered. In other words, in the odd fields (first and third fields) of the double rate signal R', the blanking signal is delivered and in the even fields (second and fourth fields) of the double rate signal R', the right eye image information signal R is delivered every field in the form of the signals R1 and R2 each having the compressed half period.

As in the case of the double rate signal L', delivery of signals in the even fields (second and fourth fields) of the double rate signal R' is controlled by means of the write control circuit (identical to 23 of 10A) and read control circuit (identical to 24 of 10A) in the signal conversion circuit 10B and delivery of the blanking signal in the odd fields (first and third fields) of the double rate signal R' is carried out by temporarily stopping read of the read control circuit. The temporary stoppage of read may also be effected on the basis of the stereo display mode designation signal (M3) from the terminal 8, though not shown.

The above signal conversion is performed for each component signal of the right eye image information signal R, so that component signals (Y1B, C1B, C2B) subject to double rate conversion are delivered out of the signal conversion circuit 10B and supplied to the signal processing circuit 30 through the terminals 5, 6 and 7.

Thus, the component signals (Y1A, C1A, C2A) and the component signals (Y1B, C1B, C2B) delivered out of the two signal conversion circuits 10A and 10B, respectively, are suitably added together on the basis of the stereo display mode designation (M3) from the terminal 8 by means of the signal processing circuit 30, with the result that a signal of a series of the individual components is generated as shown at (E) in FIG. 9 and is supplied, as (Y1, C1, C2), to the signal switching circuit 20. More particularly, in the stereo display mode (M3), the processing for Y1=Y1A+Y1B, C1=C1A+C1B and C2=C2A+C2B is carried out in the signal processing circuit 30 and resulting signals are delivered. Consequently, as is clear from (E) in FIG. 9, a double rate signal can be obtained in which the left eye image information signal L (L1 and L2) corresponding to the odd fields (first and third fields) of each component output (Y1, C1, C2) and the right eye image information signal R (R1 and R2) corresponding to the even fields (second and fourth fields) of each component output are time-division multiplexed every field in order of L1, R1, L2 and R2.

Shown at (A) and (C) in the timing chart of FIG. 9 is a case where the field commencement is the same for the two-channel signals L and R. In this case, in order to obtain the above time-division multiplexed signal ((E) in FIG. 9), the double rate signal R' must be delayed by about one field period (about $1/120$ seconds) relative to the double rate signal L'. Accordingly, to ensure the signal delay, the capacity of each of the memories 16, 17 and 18 of the signal conversion circuit 10A must be smaller than the memory capacity of the signal conversion circuit 10B.

Contrary to this, when the two-channel signals L and R are adjusted in advance on the side of, for example, supply or transmission of the stereoscopic television signal in such a manner that one signal R is supplied at a timing for field commencement which is delayed by about one field period (about $1/120$ seconds) relative to that of the other signal L, algorithm of signal conversion can be substantially the same for the signal conversion circuits 10A and 10B and loads imposed on the memories in the two circuits can be reduced, having the advantage of reducing the cost of the device.

For generation of the time-division multiplexed signal ((E) in FIG. 9), the vertical deflection pulse VD1 based on the time axis of one double rate signal L' may be supplied, as necessary, to the read control circuit (identical to 24 of 10A) of the signal conversion circuit 10B, as shown at a dotted path in FIG. 8, for example, to control read of the signal in synchronism with the vertical deflection pulse VD1. With this construction, even when, for example, a variation in time axis occurs between the two-channel signals L and R, its influence can be removed completely and exact coincidence can be ensured between time axes of the two double rate signals L' and R' to permit the stable signal processing.

When stereo display of the two-channel stereoscopic television signals is commanded externally, the respective component signals (Y1, C1, C2) based on the original stereoscopic television signal and subjected to double rate and time division multiplex as described above are selectively switched so as to be suitably subjected to matrix operation, thus decoding three primary color signals R, G and B based on the double rate stereoscopic television signal.

On the other hand, the horizontal deflection pulse HD1 ((F) in FIG. 9) and vertical deflection pulse VD1 ((G) in FIG. 9) from the pulse generation circuit 22 of the signal generation circuit 10A are selectively switched by means of the deflection switching circuit 41 on the basis of the display command (M3) of the stereoscopic television signal and delivered to the deflection system 42.

Through the above operation, the three primary color signals based on the original stereoscopic television signal from the signal switching circuit 20 and subjected to double rate and time division multiplex are supplied to the display 50 and vertical deflection at fV=119.88 Hz and horizontal deflection at fH=31.50 kHz are carried out on the basis of deflection pulses from the deflection switching circuit 41 by means of the deflection system 42 to display a color image of the stereoscopic television signal at the double rate (as a double image of left eye image L and right eye image R).

Identification information for indicating whether or not the stereoscopic television signal is presented to the display device may be multiplexed with the stereoscopic television signal from the terminals 1A and 1B and then supplied or may be supplied through a system separate from the stereoscopic television signal, whereby a mode designation signal for monaural (M1) or stereo (M3) may be generated on the basis of the supplied identification information or an identified mode may be displayed on the outside of the television set to inform a user of the identified mode. Especially, in case the former construction is adopted to automatically generate the mode designation signal interiorly of the television set on the basis of the identification information, the stereo display mode (M3) can be displayed automatically when, for example, a stereoscopic television signal using a plurality of channels is presented or automatic display can be ensured in the aforementioned monaural display mode (M1) of high image quality when a usual single channel standard television signal is presented, thus promoting easy-to-handle nature of the device.

Incidentally, in order for the stereo display of this stereoscopic television signal to be visualized as a stereoscopic image, optical shutter glasses using, for example, liquid crystal or the like is used as will be described below.

In the embodiment of FIG. 8, the vertical deflection pulse VD1 having a period of $1/120$ seconds ((G) in FIG. 9) delivered out of the signal conversion circuit 10A is 1/2 frequency-divided in a switching signal generation circuit 33 to generate a switching signal SW having a period of $1/60$ seconds which in turn is delivered to a terminal 1S.

As shown at (H) in FIG. 9, this switching signal SW is a signal whose polarity is, for example, high level "H" in correspondence to the odd fields (first and third fields) in which the left eye image information L of the time-division multiplexed stereoscopic television signal ((E) in FIG. 9) is multiplexed and is low level "L" in correspondence to the even fields (second and fourth fields) in which the right eye image information R is multiplexed.

The switching signal SW having the polarity as above is supplied to, for example, the aforementioned liquid crystal shutter glasses, not shown, through the terminal 1S to switch open/close of the left and right shutter lenses every field alternation (every 1/120 seconds) in synchronism with the switching signal SW. More specifically, during the period of high level "H" of the switching signal SW, a shutter for left eye is opened and a shutter for right eye is close but during the period of low level "L", the shutter for right eye is conversely opened but the shutter for left eye is closed. Through this, the left eye can view only the left eye image information L and the right eye can view only the right eye image information R and as a result, a stereoscopic image based on the stereoscopic television signal can be visualized.

It is to be noted that when the left and right lenses of the liquid crystal glasses are switched simultaneously only during either one of the high and low levels of the switching signal SW, a stereoscopic image can be visualized monaurally. For example, when the left and right shutters are opened only during the high level "H" of the switching signal SW but both the shutters are closed during the low level "L", only the television signal from the terminal 1A can be visualized (monaurally); but conversely, when the left and right shutters are opened only during the low level "L" of the switching signal SW but both the shutters are closed during the high level "H", only the television signal from the terminal 1B can be visualized (monaurally). With such a switching selection function built in, for example, the liquid crystal shutter glasses, the user can be allowed to freely select stereo watching or monaural watching by hand while watching television and new added value which has not hitherto been available can be given.

In this manner, according to the present invention, the television signals of a plurality of channels can be selected separately individually and visualized monaurally and therefore, even when not the stereoscopic television signal but independent television signals of two channels are connected to the two terminals 1A and 1B, preferable one of the television signals can be freely selected by means of the shutter glasses and can be visualized.

Further, when two or more sets of shutter glasses are prepared and for example, first glasses are used for viewing a first channel television program from the terminal 1A while second glasses being used for viewing a second channel television program from the terminal 1B, preferable one of the independent two channel television signals can be selected freely and viewed through each set of glasses and therefore, a plurality of persons can individually freely select and view programs of different channels on a single television. In this case, added information such as a voice signal accompanying a selected television signal is of course switched synchronously with the television signal so as to be listened to through, for example, earphones.

Incidentally, since the period of the switching signal SW is set to be the same as the field period of the standard television signal which is 1/60 seconds, either one of the stereo display image and monaural display image visualized by switching the switching signal SW has a field period of 1/60 seconds. In other words, even when the stereoscopic television signal is displayed in either stereoscopically or monaurally, it can always be visualized at the same field frequency as that of the standard television signal and therefore, a natural image free from flicker disturbance and unnaturalness can be obtained.

The switching signal SW may also be generated on the basis of the vertical deflection pulse (identical to VD1 shown at (G) in FIG. 9) delivered out of the pulse generation circuit (identical to 22 of 10A) of the signal conversion circuit 10B, though not illustrated.

Incidentally, the number of scanning lines N is described as being selected to be odd for the sake of improving the image quality of the monaural display image as has been described in connection with FIGS. 3 and 4 but the present invention is not limited thereto and N may also be even. In the case of stereo display, N may be either odd or even.

Further, in the above embodiment, display of the double rate signal is described as being effected by generating the vertical deflection pulse VD1 so that the period of each field of the double rate signal may be constant as shown at (E) in FIG. 2 and at (G) in FIG. 9, that is, signals of 262.75 lines are included in common to the respective periods of the individual fields occurring every 1/120 seconds but the present invention is not limited thereto and for example, the period of the vertical deflection pulse VD1 may be changed field by field as below.

Figure 10:
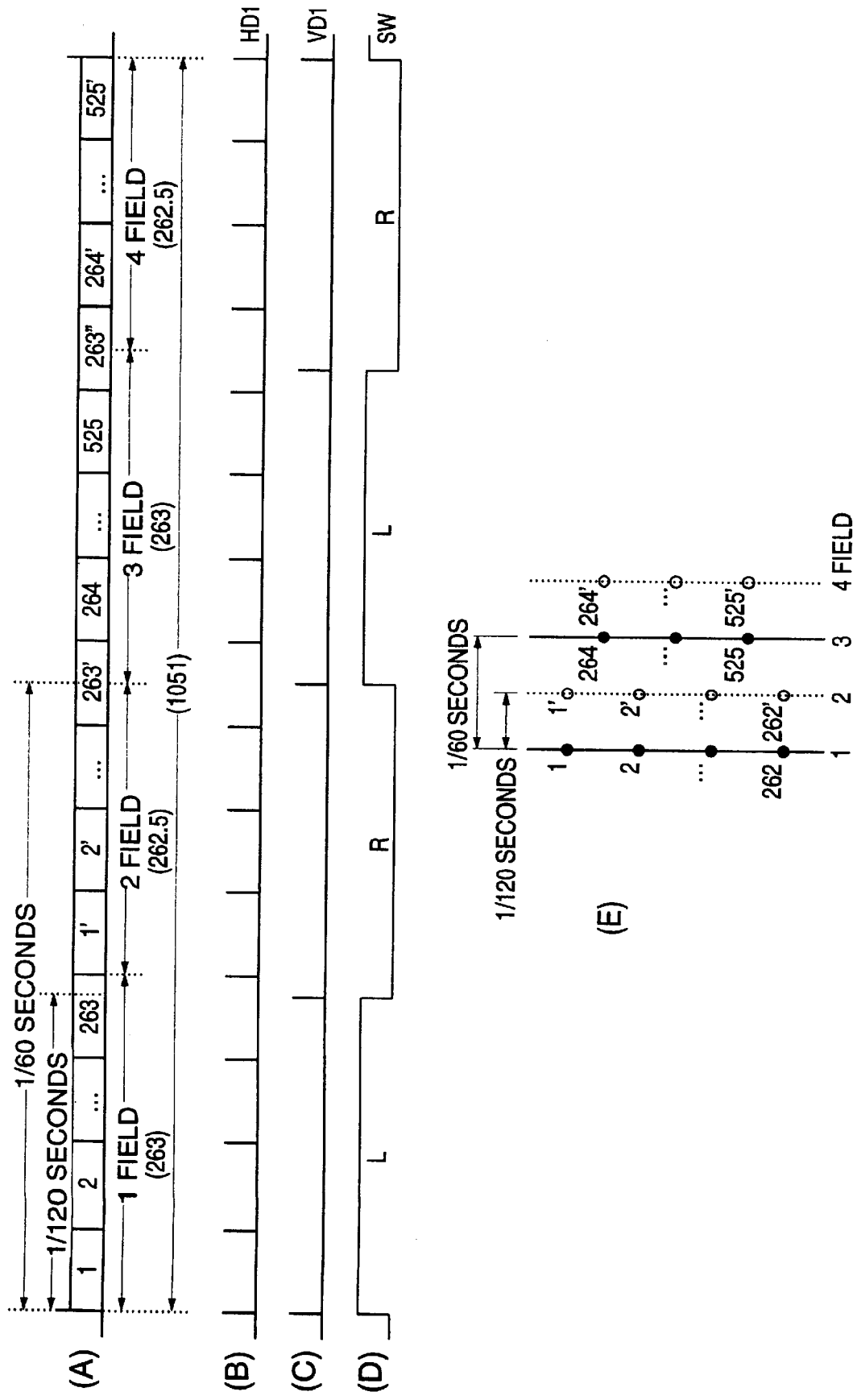
FIG. 10 is a diagram showing another embodiment of the waveforms and timings of the television signal in FIG. 8.

For example, FIG. 10 shows waveforms and timings in another embodiment of stereo display in which N is selected to be 1051 in the embodiment of FIG. 8.

Shown at (A) in FIG. 10 is a double rate signal delivered out of the signal processing circuit 30 in FIG. 8 when stereo display is effected with N selected to be 1051. A waveform at (A) is similar to that at (E) in FIG. 9 but the number of lines constituting respective fields is different from that at (E) in FIG. 9.

Shown at (B) and (C) are horizontal deflection pulse HD1 and vertical deflection pulse VD1 delivered out of the signal conversion circuit 10A, respectively, and shown at (D) is a switching signal SW delivered out of the switching signal generation circuit 33. The horizontal deflection pulse HD1 has the same waveform as that at (F) in FIG. 9. In contrast, the vertical deflection pulse VD1 at (C) occurs at different timings from those at (G) in FIG. 9 and the switching signal SW at (D) also occurs at different timings from those at (H) in FIG. 9.

More particularly, as shown at (A) in FIG. 10, signals of 1st to 263rd lines in the first field of the first channel signal (for example, left eye image information signal L) from the terminal 1A are delivered in a first field of the double rate signal, signals of 1'st to 263'rd lines in the first field of the second channel signal (for example, right eye image information signal R) from the terminal 1B are delivered in a next second field of the double rate signal, signals of 264th to 525th lines in the second field of the first channel signal are delivered in a third field of the double rate signal, and signals of 264'th to 525'th lines in the second field of the second channel signal are delivered in a next fourth field of the double rate signal. The period for blanking may suitably be generated between adjacent fields.

On the other hand, as shown at (C) and (D) in FIG. 10, the period of the vertical deflection pulse VD1 and switching signal SW is not constant for each field and for example, these signals are delivered at a period corresponding to 263 lines in the first and third fields and at a period corresponding to 262.5 lines in the second and fourth fields. Accordingly, signals of N=(263+262.5)×2=1051 lines are contained in the period of one frame of the double rate signal.

Consequently, as shown at (E) in FIG. 10, a scanning line structure of the double rate signal displayed in accordance with deflection based on the horizontal deflection pulse HD1 and vertical deflection pulse VD1 is such that the interlaced relation stands between the first and third fields (in which the first channel signal L is displayed) and between the second and fourth fields (in which the second channel signal R is displayed) but spatial coincidence of the scanning position of each scanning line is held between the first and second fields and between the third and fourth fields. In this manner, by slightly changing the timing for generation of the vertical deflection pulse VD1, the two channel signals can be displayed with their scanning positions in the vertical direction made to be coincident every field in a relatively simple way and therefore, for example, an image portion in which parallax between left and right eyes is large and the correlation between the channels is small can be displayed on the same line and flicker can be reduced visually.

Conversely, in case the vertical deflection pulse VD1 at the timing shown at (G) in FIG. 9 is generated, an image portion where parallax between the left and right eyes is small and the correlation between the two channels is large (for example, a flat portion) is displayed with scanning lines interlaced mutually and substantially doubled in number and hence improvements in image quality can be obtained as in the case of the monaural display.

While in the above operational description the stereoscopic television signal is described as being visualized by using, for example, the liquid crystal shutter glasses, television can also be watched with high image quality without using the liquid crystal shutter glasses as usual in a manner to be described below.

More particularly, even under the condition that two-channel stereoscopic television signals are connected in the construction shown in FIG. 8, with a monaural display mode (M1) designated and on the basis of the mode designation signal from the terminal 8, the previously-described field interpolation processing shown at (C) in FIG. 2 can be carried out in the read control circuit 24 of the signal conversion circuit 10A and the outputs (Y1B, C1B, C2B) from the signal conversion circuit 10B are inhibited and only the outputs (Y1A, C1A, C2A) from the signal conversion circuit 10A are selected and delivered in the form of Y1=Y1A, C1=C1A and C2=C2A.

Thus, even with the two-channel stereoscopic television signals connected, either one of the channel signals (in the above embodiment, one channel signal connected to the terminal 1A) can be displayed as a (monaural) image of high image quality as described in connection with FIG. 1 with the number of scanning lines substantially doubled. Accordingly, by incorporating this switching selection function into, for example, the television set, the user can freely select stereoscopic watching or monaural watching while watching the television even when a stereoscopic television signal is connected, and especially when monaural watching is selected, the user can afford to enjoy a picture of high image quality without glasses and added value of the television can be promoted greatly.

In the embodiment of FIG. 8, by setting the mode designation signal from the terminal 8 to a high definition mode (M2) as has been described in connection with FIG. 1, a high definition television signal inputted to the terminals 2, 3 and 4 can be displayed.

In a case where a third standard television signal is displayed (monaurally) independently of the two-channel stereoscopic television signals, a television signal from, for example, the terminal 1A may be switched so as to permit the third television signal to be supplied to the signal conversion circuit 10A and the mode designation signal from the terminal 8 may be set to a monaural mode (M1). Through this, independently of display of the stereoscopic television signals, the user can afford to enjoy a usual monaural television broadcasting signal with high image quality, having ability to freely select various modes.

As is clear from the embodiment of FIG. 8, if the signal conversion circuit 10B is constructed as, for example, an optional adapter type which can afterwards be added to the outside of the television set or an optional unit type which can afterwards be build in the television set, the user can afford to enjoy stereoscopic television with ease by merely additionally buying the adapter or the unit as necessary and added value such as extensibility and prospect of the television set can be promoted greatly.

In the embodiments of FIGS. 1 and 8, the signal of composite type is described as being handled to obtain the double rate signal but the present invention is not limited thereto and for example, a standard signal (NTSC signal) of composite type may be decoded in advance to obtain signals of component type (a brightness signal Y and two color signals C1 and C2) and the respective component signals may be inputted to the display device based on the present invention.

More specifically, a terminal practically used at present, for example, a so-called S terminal may be used as a terminal for input/output of signals of component type and the signals of component type may be supplied to the display device of the present invention through the S terminal. Typically, the S terminal interfaces the carrier color signal C in which the two color signals C1 and C2 are quadrature-multiplexed with a color sub-carrier and therefore, when this S terminal is used, the two color signals C1 and C2 may be decoded for separation from the carrier color signal C and thereafter, the respective component signals (Y, C1, C2) may be supplied to the A/D conversion circuits 13, 14 and 15, respectively, of each of the signal conversion circuits 10A (and 10B).

Next, another embodiment of the double-density display according to the present invention will be described with reference to timing diagrams of FIGS. 11 and 13 and scanning line structure diagrams of FIGS. 12 and 14 corresponding to the timing diagrams, respectively.

Figure 11:
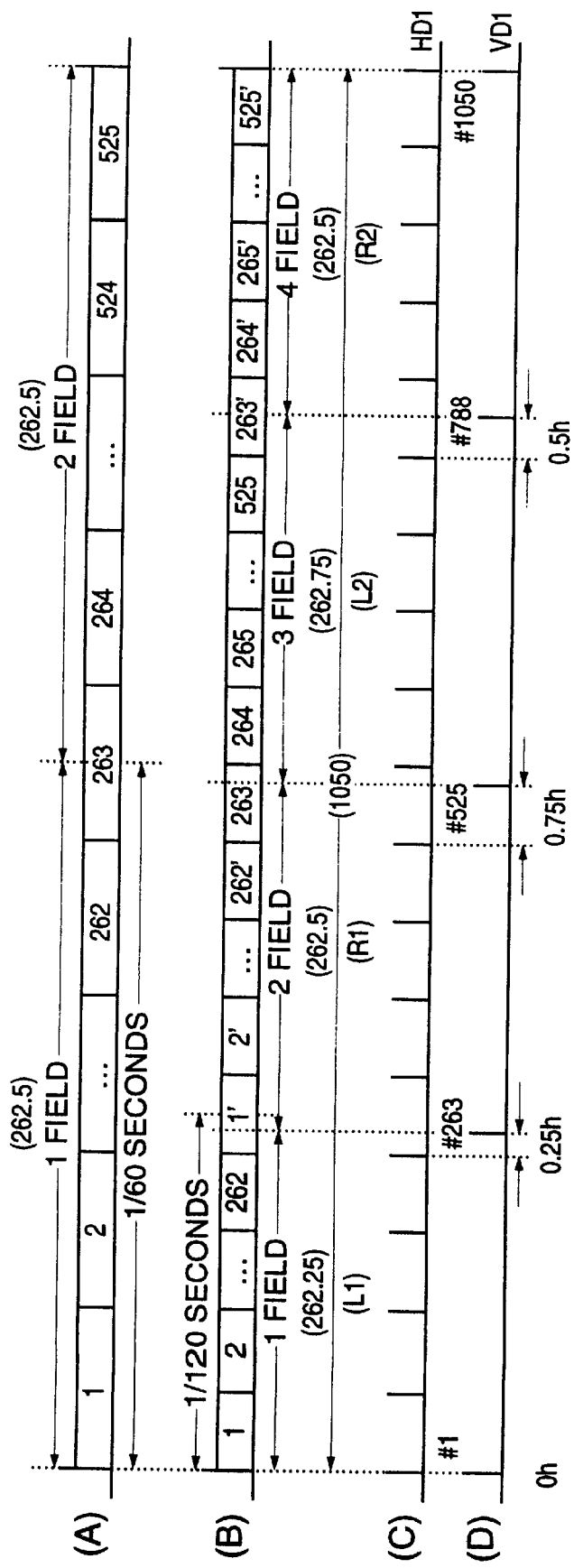
FIG. 11 is a diagram showing another embodiment of waveforms and timings of a television signal according to the present invention.
Figure 13:
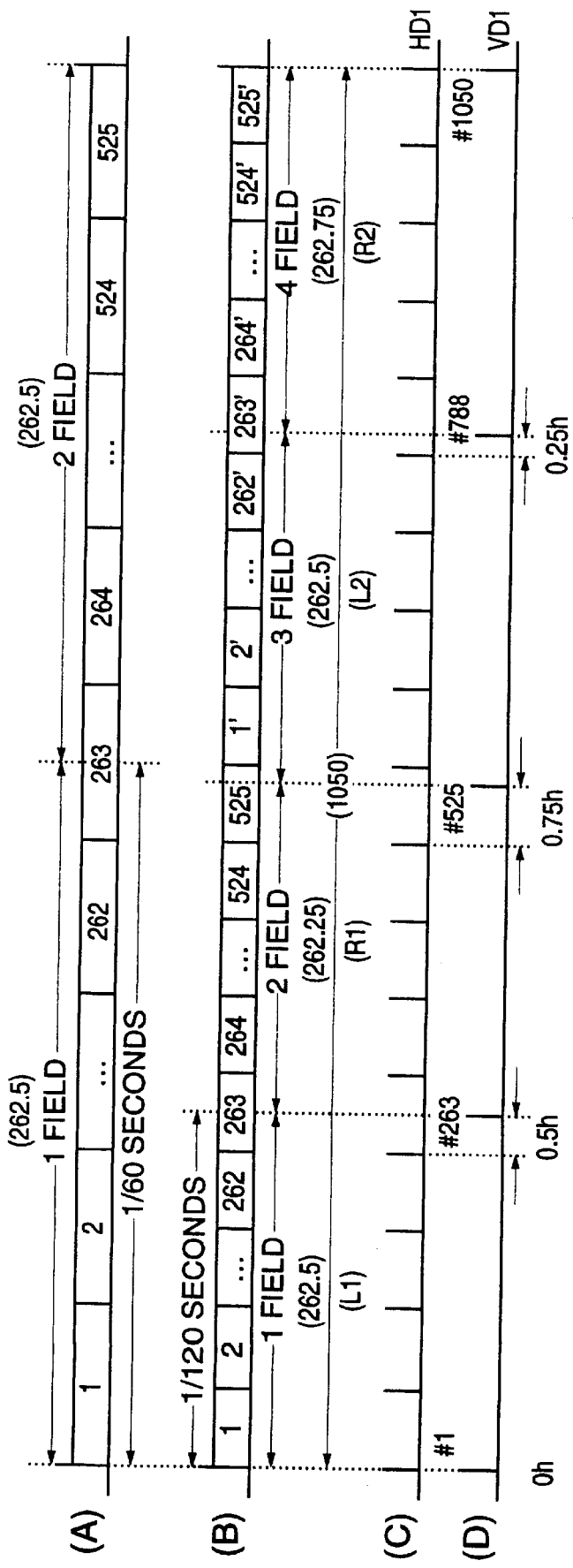
FIG. 13 is a diagram showing another embodiment of the waveforms and timings of the television signal according to the present invention.

In FIGS. 11 and 13, the standard NTSC signal before scanning conversion is shown at (A), double rate signals undergoing scanning conversion based on another embodiment in the monaural display mode are shown at (B), and double rate horizontal synchronizing signal HD1 and double rate vertical synchronizing signal VD1 based on another embodiment and generated upon image display of the double rate signal are shown at (C) and (D), respectively. In both the embodiments of FIGS. 11 and 13, N=1050 is selected for double-density display, the double rate signal is so converted as to have a field period of $\frac{1}{120}$ seconds which is substantially half the field period of the standard NTSC signal, scanning lines averaged in number to 262.5 within the period of one field which is $\frac{1}{120}$ seconds, and the number of scanning lines N=262.5×4=1050 within the period of four fields (i.e., within the period of one frame of the standard NTSC signal).

In the embodiments of FIGS. 11 and 13, the operation of scanning conversion according to the present invention to be carried out at the memories (16, 17, 18) slightly differs in timing from that in the case of FIG. 2 and the display device of FIG. 1 can be applied without alteration.

The embodiment of FIGS. 11 and 12 will first be described.

Referring to FIG. 11, as shown at (B), within the period of a first field of the double rate NTSC signal, signals of 1st to 262nd lines in the first field of the standard NTSC signal are read out of the memories at a double rate so as to be delivered as signals of lines 1 to 262 (consecutive numbers #1 to #262) and within the period of a succeeding second field, the signals of 1st to 262nd lines in the first field of the standard NTSC signal are again read so as to be delivered as signals of lines 1' to 262' (consecutive numbers #263 to #524). Within a succeeding third field, signals of 263rd to 525th lines in the second field of the standard NTSC signal are read out of the memories at the double rate so as to be delivered as signals of lines 263 to 525 (consecutive numbers #525 to #787) and within the period of a succeeding fourth field, the signals of 263rd to 525th lines in the second field of the standard NTSC signal are again read so as to be delivered as signals of lines 263' to 525' (consecutive numbers #788 to #1050).

In this case, too, by temporarily stopping read of signals from the memories over periods of one line or a plurality of lines before and after the boundary between the first and second fields, the boundary between the second and third fields, the boundary between the third and fourth fields, and the boundary between the fourth field and a first field of the next frame, the blanking period in which no signal is delivered may be formed as in the case described in connection with FIG. 1.

Read operation in a unit of line from the memories and read operation from fields can be controlled as in the precedence on the basis of the double rate horizontal synchronizing signal HD1 and double rate vertical synchronizing signal VD1 generated by the pulse generation circuit 22.

As shown at (D), the double rate vertical synchronizing signal VD1 has a period corresponding to about 262.25 lines in the first field, a period corresponding to about 262.5 lines in the second field, a period corresponding to about 262.75 lines in the third field and a period corresponding to about 262.5 lines in the fourth field, indicating that the period is inconstant for the respective fields, but has a constant period (TF) corresponding to 1050 lines within the period of one frame.

In this case, too, the previously-described relation (3) stands among the horizontal scanning frequency fH, frame vertical scanning frequency fF (=1/TF) and field vertical scanning frequency fV.

Figure 12:
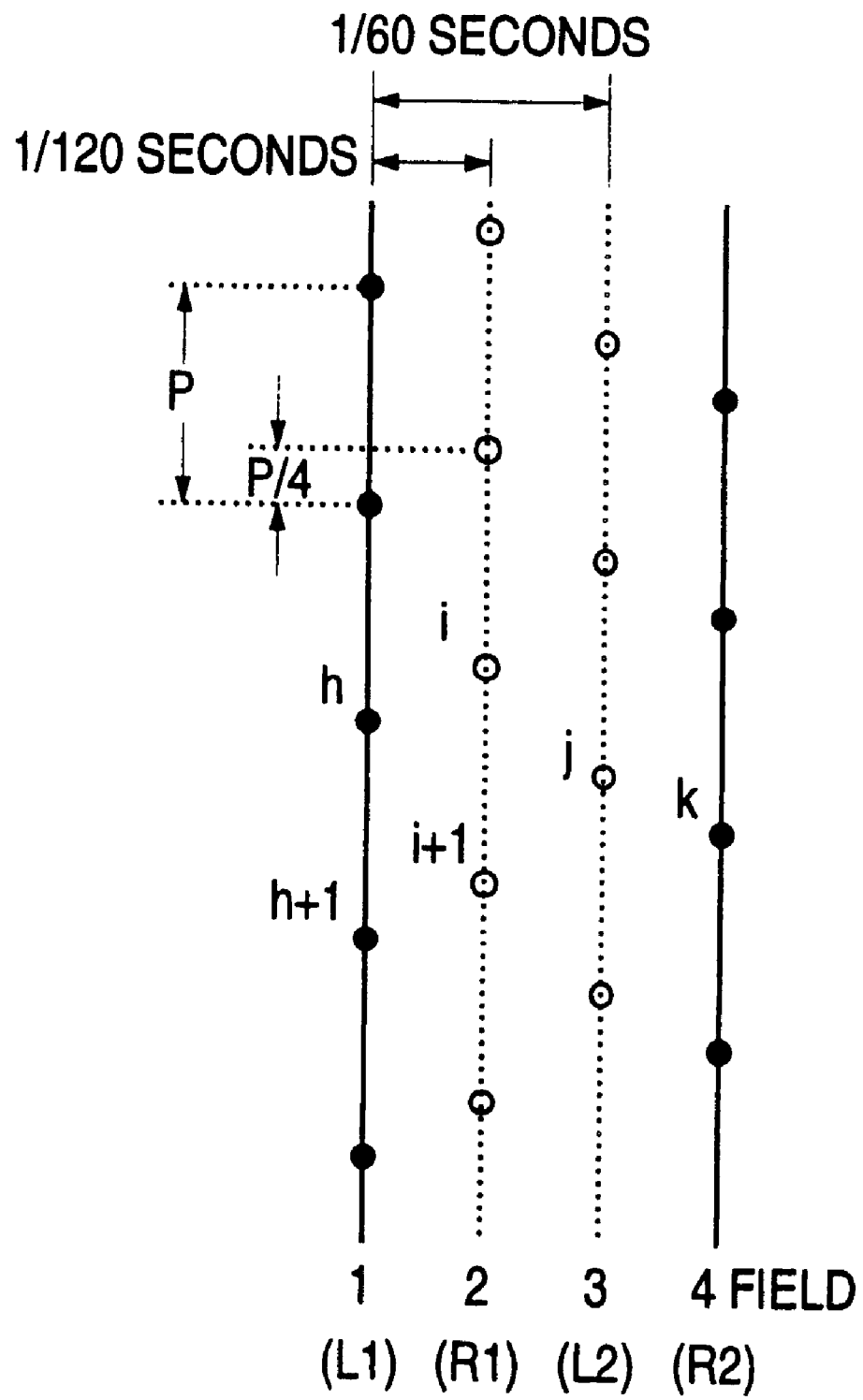
FIG. 12 is a diagram showing a scanning line structure for a television signal based on FIG. 11.

With the above construction, as shown in FIG. 12, the double rate NTSC signal is displayed in such a phase relation that a signal of an m-th line in the first field of the standard NTSC signal is delivered as a signal of h-th line in the first field and a signal of i-th line in the second field of the double rate NTSC signal, a signal of n-th line in the second field of the standard NTSC signal is delivered as a signal of j-th line in the third field and a signal of k-th line in the fourth field of the double rate NTSC signal, the k-th line in the fourth field is 2:1 interlaced between the h-th line and an (h+1)-th line in the first field of the double rate NTSC signal, the j-th line in the third field is 2:1 interlaced between the i-th line and an (i+1)-th line in the second field, and the second and third fields are displaced by 1/4 of a line interval P (1/4 line offset) in the vertical direction (in this embodiment, in the vertically upward direction in the drawing) in relation to the first and fourth fields, respectively.

According to the scanning conversion method based on the embodiment of FIG. 11 as above, there result the operational effect of a kind of time filter which interpolates fields in the time direction to double the field repetition number per frame and the operational effect of a vertical filter which interpolates scanning lines in the vertical direction within the frame to perform display with the line number per frame doubled. Accordingly, the problem of flicker disturbance affecting the field period encountered in the conventional standard NTSC signal display can be removed and especially when the brightness of display is increased, a flicker disturbance which would otherwise occur at a large area portion of display image can be eliminated and the stable high image quality removed of flicker can be obtained.

In the conventional standard NTSC signal, line crawling, line and line structure flicker concomitant with interlaced scanning and scanning line disturbance are largely responsible for deterioration of image quality but according to the above scanning conversion method, by the particular vertical filtering action due to the scanning line interpolation and by the action of wobbling due to the 1/4 line offset, the line crawling and line flicker can be decreased visually to a great extent and the high image quality of extremely less flicker can be obtained. And besides, since display is effected with the number of scanning lines doubled (double-density display), the line structure can be eliminated and especially when display is realized with high definition, the structure of scanning lines is hardly perceived, thereby providing high image quality featured by overall, extreme smoothness, transparentness and luster.

Further, since the time series sequence by which the field repeats by itself remains unchanged as compared to that of the original standard NTSC signal, unnatural movement and deterioration in resolution of movement can be avoided and display having high fidelity to the original image in terms of movement of image can be effected.

In the embodiment of FIG. 12, the interpolation of scanning lines based on 1/4 line offset is described as being carried out in the vertically upward direction but the present invention is not limited thereto and the interpolation may be carried out in the vertically downward direction to attain the operation and effect similar to those described hereinbefore.

The above-described phase relation of vertical scanning among fields (line offset) can easily be established by adjusting the phase of the double rate vertical synchronizing signal VD1 every field. For example, in order to obtain the scanning line structure as shown in FIG. 12 (i.e., the line offset phase relation among fields), the double rate vertical synchronizing signal VD1 can be generated on the basis of pulse signals having phases which are individually adjusted in the first to fourth fields within the period of one frame as will be described below.

More particularly, in the phase adjuster 215, as shown at (D) in FIG. 11, a pulse signal of a first phase is generated at, for example, a line position of #1 (in the first field) of the double rate NTSC signal and by using this phase as a reference (rendering this phase zero), a second pulse signal having a phase close to 0.25h (where, 1h is the period of one line of the double rate NTSC signal and is given by 1h=1/fH) is generated at a line position of #263 (the boundary between the first and second fields), a third pulse signal having a phase close to 0.75h is generated at a line position of #525 (the boundary between the second and third fields) and a fourth pulse signal having a phase close to 0.5h is generated at a line position of #788 (the boundary between the third and fourth fields), these pulse signals being delivered as the double rate vertical synchronizing signal VD1 to the terminal 202.

Incidentally, in the above embodiment of FIGS. 11 and 12, the scanning conversion is described as being such that the number of scanning lines N of the double rate signal is 1050 but the present invention is not limited thereto. In the present invention, the number of scanning lines N of the double rate signal may be a desired integer which is nearly twice the number of scanning lines N1 of the standard NTSC signal but with the vertically upward 1/4 line offset effected or conversely with the vertically downward 1/4 line offset effected as shown in FIG. 12, the width of variation in the period in each field of the double rate vertical synchronizing signal VD1 can be minimized by selecting 4M+2 for N (for example, N=1050 or 1126) where M is an arbitrary integer.

By minimizing the period variation width of the double rate vertical synchronizing signal in this manner, the influence of irregularity in phase adjustment by the phase adjuster 215 and irregularity in the deflection system 42 of the receiver set for display of the double rate signal can be reduced, thus making it easy to perform double-density display with a desired phase relation as shown in FIG. 12.

Next, the embodiment of FIGS. 13 and 14 will be described.

Referring to FIG. 13, as shown at (B), within the period of a first field of a double rate NTSC signal, signals of 1st to 262nd lines in the first field of the standard NTSC signal are read out of the memories at a double rate so as to be delivered as signals of lines of 1 to 262 (consecutive numbers #1 to #262) and within the period of a succeeding next second field, signals of 263rd to 525th lines in the second field of the standard NTSC signal are read so as to be delivered as signals of lines 263 to 525 (consecutive numbers #263 to #525). Within the period of a next third field, the signals of 1st to 262nd lines in the first field of the standard NTSC signal are again read out of the memories at the double rate so as to be delivered as signals of lines 1' to 262' (consecutive numbers #526 to #787) and within the period of a succeeding next fourth field, the signals of 263rd to 525th lines in the second field of the standard NTSC signal are again read so as to be delivered as signals of lines 263' to 525' (consecutive numbers #788 to #1050).

In this case, too, by temporarily stopping read of signals from the memories over periods of one line or a plurality of lines before and after the boundary between the first and second fields, the boundary between the second and third fields, the boundary between the third and fourth fields and the boundary between the fourth and a first field of the next frame, the blanking period in which no signal is delivered may be formed as in the case described in connection with FIG. 1.

Read operation in a unit of line from the memories and read operation from fields can be controlled as in the precedence on the basis of the double rate horizontal synchronizing signal HD1 and double rate vertical synchronizing signal VD1 generated by the pulse generation circuit 22.

As shown at (D), the double rate vertical synchronizing signal VD1 has a period corresponding to about 262.5 lines in the first field, a period corresponding to about 262.25 lines in the second field, a period corresponding to about 262.5 lines in the third field and a period corresponding to about 262.75 in the fourth field, indicating that the period is inconstant for the respective fields, but has a constant period (TF) corresponding to 1050 lines within the period of one frame.

In this case, too, the previously-described relation (3) stands among the horizontal scanning frequency fH, frame vertical scanning frequency fF (=1/TF) and field vertical scanning frequency fV of the double rate signal obtained by the present invention.

With the above construction, as shown in FIG. 14A, the double rate NTSC signal is displayed in such a phase relation that a signal of an m-th line in the first field of the standard NTSC signal is delivered as a signal of h-th line in the first field and a signal of j-th line in the third field of the double rate signal, a signal of n-th line in the second field of the standard NTSC signal is delivered as a signal of i-th line in the second field and a signal of k-th line in the fourth field of the double rate signal, the i-th line in the second field is 2:1 interlaced between the h-th line and an (h+1)-th line in the first field of the double rate signal, the k-th line in the fourth field is 2:1 interlaced between the j-th line and a (j+1)-th line in the third field, and the third and fourth fields are displaced by 1/4 of a scanning line interval P (1/4 line offset) in the vertical direction (in this embodiment, in the vertically downward direction in the drawing) in relation to the first and second fields, respectively.

According to the scanning conversion method based on the embodiment of FIG. 13 as above, by the action of the time filter for the frame period, flicker disturbance in the frame period can be eliminated. Especially, a frame still image accompanying movement between fields can therefore be freed from flicker and in cooperation with the scanning line double-density display, still image display totally removed of flicker and having transparentness can be effected.

In this case, too, by adjusting the phase of the double rate vertical synchronizing signal VD1 every field by means of the phase adjuster 215 as in the precedence, a desired phase relation of vertical scanning among fields (line offset) can be obtained. Accordingly, by changing the phase adjustment, a scanning pattern shown in FIG. 14B, for example, can also be obtained.

In FIG. 14B, the double rate NTSC signal is displayed in such a phase relation that a signal of an m-th line in the first field of the standard NTSC signal is delivered as a signal of h-th line in the first field and a signal of j-th line in the third field of the double rate signal, a signal of n-th line in the second field of the standard NTSC signal is delivered as a signal of i-th line in the second field and a signal of k-th line in the fourth field of the double rate signal, the k-th line in the fourth field is 2:1 interlaced between the h-th line and an (h+1)-th line in the first field of the double rate signal, the j-th line in the third field is 2:1 interlaced between an (i−1)-th line and the i-th line in the second field, and the second and third fields are displaced by 1/4 of a scanning line interval P (1/4 line offset) in the vertical direction (in this embodiment, in the vertically upward direction in the drawing) in relation to the first and fourth fields, respectively.

In the former embodiment of FIG. 14A, a case where N=4M+2 (N=1050 or 1126) is set for an arbitrary integer M and the vertically downward 1/4 line offset is effect in order to minimize the period variation width of the double rate vertical synchronizing signal VD1 has been described but this is not limitative and display may be carried out in such a phase relation that N=4M (N=1048 or 1124) is set and vertically upward 1/4 line offset is effected. With this construction, the period variation width in each field of the double rate vertical synchronizing signal VD1 can be minimized.

In the latter embodiment of FIG. 14B, the 1/4 line offset is described as being effected vertically upwards but conversely, in the case of vertically downward 1/4 line offset, too, the period variation width in each field of the double rate vertical synchronizing signal VD1 can be minimized by particularly selecting N=4M+2 (for example, N=1050 or 1126) for a desired integer M.

In the foregoing, the embodiment directed to monaural double-density display of the standard television signal has been described but the present invention is not limited thereto and may also be applied to stereo double-density display of the stereoscopic television signal.

The stereoscopic television signal applied to the present invention is not limited to that shown in the embodiment of FIG. 9 and the present invention may also be applied to the case stereoscopic television signals of various different types as described below are combined with the scanning patterns shown in FIGS. 3, 12, 14A and 14B to undergo stereo double-density display.

For example, in a first embodiment to this effect, like the embodiment of FIG. 9, the stereoscopic television signal is constructed of two-channel video information signals conformable to the standard NTSC signal, having such a format that a first channel image information signal (for example, the left eye image information signal) L and a second channel image information signal (for example, the right eye image information signal) R are contained in each of the first and second fields every frame and when the stereoscopic television signal is stereoscopically displayed in the scanning pattern of FIGS. 12, 14A or 14B, double-density display is effected such that a signal (L1) of m-th (consecutive ordinal numbers #1st to #262nd) line in the first field and a signal (L2) of n-th (consecutive ordinal numbers #263rd to #525th) line in the second field of the first channel video information signal L are delivered as a signal of h-th line in the first field and a signal of j-th line in the third field of the double rate signal, respectively, and a signal (R1) of m-th (consecutive ordinal numbers #1st to #262nd) line in the first field and a signal (R2) of n-th (consecutive ordinal numbers #263rd to #525th) line in the second field of the second channel video information signal R are delivered as a signal of i-th line in the second field and a signal of k-th line in the fourth field of the double rate signal, respectively.

Alternatively, in a second embodiment, the stereoscopic television signal is also conformable to the standard NTSC signal, having such a format that only a first channel video information signal L and only a second channel video information signal R are contained in first and second fields, respectively, every frame and when the stereoscopic television signal is stereoscopically displayed in the scanning pattern of FIGS. 3, 12, 14A or 14B, double-density display is effected such that a signal of m-th (consecutive ordinal numbers #1st to #262nd) line in the first field containing the first channel video information signal L is delivered as a signal of h-th line in the first field and a signal of j-th line in the third field of the double rate signal and a signal of n-th (consecutive ordinal numbers #263rd to 525th) line in the second field containing the second channel video information signal R is delivered as a signal of i-th line in the second field and a signal of k-th line in the fourth field of the double rate signal.

Alternatively, in a third embodiment, the stereoscopic television signal is conformable to a television signal of progressive scanning type, having such a format that only a first channel video information signal L and only a second channel video information signal R are contained in first and second fields, respectively, every frame, (the progressive scanning television signal being such that, for example, the field frequency is fV2=60.0 Hz, the number of scanning lines in one frame is N2=1050, each frame is constructed of first and second two fields each having N2/2=525 scanning lines, the horizontal scanning frequency is fH2=N2×fV2/2= 31.5 kHz and the phase relation is so determined that an m-th line in the first field and an n-th line in the second field are displayed in overlapping relation on the screen) and when the stereoscopic television signal is stereoscopically displayed in the scanning pattern of FIGS. 3, 12, 14A or 14B, double-density display is effected such that a signal (L1) of m-th (for example, odd consecutive ordinal numbers #1st, #3rd, #5th, . . . , #525th) line occurring every other line and a signal (L2) of m'-th (for example, even consecutive ordinal numbers #2nd, #4th , #6th, . . . , #524th) line occurring every other remaining line in the first field containing the first channel video information signal L are delivered as a signal of h-th line and a signal of j-th line in the first and third fields of the double rate signal, respectively, and a signal (R1) of n-th (for example, even consecutive ordinal numbers #526th, #528th, #530th, . . . , #1050th) line occurring every other line and a signal (R2) of n'-th (for example, odd consecutive ordinal numbers #527th, #529th, #531st, . . . , #1049th) line occurring every other remaining line in the second field containing the second channel video information signal R are delivered as a signal of i-th line and a signal of k-th line in the second and fourth fields of the double rate signal, respectively.

Alternatively, in a fourth embodiment, the stereoscopic television signal is also conformable to the progressive scanning television signal, having such a format that only a first channel video information signal L is contained in the first half of each of first and second fields and only a second channel video information signal R is contained in the second half of each of the first and second fields every frame and when the stereoscopic television signal is stereoscopically displayed in the scanning pattern of FIGS. 3, 12, 14A or 14B, double-density display is effected such that a signal (L1) of m-th (for example, consecutive ordinal numbers #1st to #262nd) line in the first half of the first field containing the first channel video information signal L and a signal (R1) of m'-th (for example, consecutive ordinal numbers #263rd to #525th) line in the second half of the first field containing the second channel video information signal R are delivered as a signal of h-th line and a signal of i-th line in the first and second fields of the double rate signal, respectively, and a signal (L2) of n-th (for example, consecutive ordinal numbers #526th to #787th) line in the first half of the second field containing the first channel video information signal L and a signal (R2) of n'-th (for example, consecutive ordinal numbers #788th to 1050th) line in the second half of the second field containing the second channel video information signal R are delivered as a signal of j-th line in the third field and a signal of k-th line in the fourth field of the double rate signal, respectively. Alternatively, in a fifth embodiment, when the stereoscopic television signal is conformable to the high definition television signal, having such a format that only a first channel video information signal L and only a second channel video information signal R are contained in first and second fields, respectively, every frame, double-density display can be effected with a construction similar to that of, for example, the third embodiment.

Alternatively, in a sixth embodiment, when the stereoscopic television signal is also conformable to the high definition television signal, having such a format that only a first channel video information signal L is contained in the first half of each of first and second fields and only a second channel video information signal R is contained in the second half of each of the first and second fields every frame, double-density display can be effected with a construction similar to that of, for example, the fourth embodiment.

In any one of the above cases, the effect of suppressing disturbance attained for monaural display images in the scanning patterns of FIGS. 3, 12, 14A and 14B can also be obtained for stereo display images in a similar way and either case falls within the category of the present invention.

In the above third (or fifth) embodiment, by assigning the same channel video information signal to the first and second fields, the progressive scanning television signal (or the high definition television signal) can be displayed monaurally at a field double rate in the scanning pattern of FIGS. 3, 12 or 14.

More particularly, a monaural television signal is conformable to the progressive scanning television signal (or the high definition television signal), having such a format that only a one-channel video information signal is contained in each of the first and second fields every frame and when double-density display of the television signal is effected in the scanning pattern of, for example, FIG. 3 or 12, the double-density display is such that a signal of m-th line occurring every other line and a signal of m'-th line occurring every other remaining line in the first field of the television signal are delivered as a signal of h-th line and a signal of i-th line in the first and second fields of the double rate signal, respectively, and a signal of n-th line occurring every other line and a signal of n'-th line occurring every other remaining line in the second field of the television signal are delivered as a signal of j-th line and a signal of k-th line in the third and fourth fields of the double rate signal, respectively.

Alternatively, when double-density display of the television signal is effected in the scanning pattern of FIG. 14A or 14B, the double-density display is such that a signal of m-th line occurring every other line and a signal of m'-th line occurring every other remaining line in the first field of the television signal are delivered as a signal of h-th line and a signal of j-th line in the first and third fields of the double rate signal, respectively, and a signal of n-th line occurring every other line and a signal of n'-th line occurring every other remaining line in the second field of the television signal are delivered as a signal of i-th line and a signal of k-th line in the second and fourth fields of the double rate signal, respectively.

In any one of the above cases, the effect of eliminating flicker disturbance can be accomplished and either case falls within the category of the present invention.

The standard television signal employed by the present invention is not limited to the NTSC signal and the present invention may be applied to desired standard television signals, for example, of ED 2 system scheduled to be broadcast in Japan and PAL system (or PAL plus system) or SECAM system presently broadcast in Europe, desired standard television signals based on digital broadcasting systems conformable to MPEG and MPEG 2 presently started to be broadcast in USA, or to stereoscopic television signals conformable to these standard television signals.

In case where of these systems, the standard television signal of the PAL system or SECA system in which the number of scanning lines N1 per frame is, for example, 625 is displayed, the standard television signal may be converted into, for example, a double rate signal in which the number of scanning lines N per frame has a value which is nearly twice N1 (for example, N=2×625+1=1251) on the basis of an embodiment of the present invention similar to FIGS. 1 and 8, though not shown, and the double rate signal may be displayed, thus attaining operational effects of the present invention as in the precedence.

Further, in case a signal based on the improved standard television signal system such as the digital broadcasting system of the ED 2 system or PAL plus system, the signal is once decoded by a decoder so that the component signals (Y, C1, C2 or Y, Pb, Pr) or the composite signal (such as NTSC) may be separated and delivered and thereafter, output signals from the decoder are inputted to the display device of the present invention so as to be subjected to the previously-described double conversion processing and then displayed.

Even when the stereoscopic television is put in broadcasting service by using, for example, the digital broadcasting system, component signals and composite signals based on the stereoscopic television may be decoded from the digital broadcasting signal by using a decoder and the decoded signals may be supplied to the display device of the present invention.

In any one of the cases, the same effects can be obtained and either case falls within the category of the present invention. Especially, with the construction as above, the various types of decoders can easily be connected to the display device and hence the user can freely receive the new service by merely additionally buying the decoder afterwards as necessary.

As a package medium for presenting the new service such as the aforementioned standard television, high definition television and stereoscopic television, a video tape recorder (VTR) such as the previously-described W-VHS has already been practiced. Also, in a digital video cassette recorder (VCR) such as D-VHS or DVC or a digital video disc recorder/player such as video CD or DVD, which has presently been studied for practicalness, the new service will be presented in future.

Accordingly, by putting the package medium, such as the W-VHS, D-VHS, DVC, DVD and video CD, and the display device of the present invention together and by supplying the output from the package medium to the display device, various kinds of service can be enjoyed freely with a single television set, making it possible to provide a television system of high added value which is advantageous in cost and performance as a whole and has high extensibility in future.

As described above, according to the present invention, a plurality of television signals such as the conventional standard television signal, high definition television signal and stereoscopic television signal having different horizontal frequencies of which is nearly twice the other and different channel numbers can be displayed with a single device by using the deflection system in common to the plurality of signals, thereby ensuring that the cost of the device can be reduced and the conventional television signal of less scanning lines can be displayed with substantially the same number of scanning lines as that of the high definition television to provide the device which can eliminate various kinds of disturbances encountered in the prior art, improve the image quality greatly and perform stereoscopic image display.

We claim:

1. An information signal display device (FIG. 12) for inputting an information signal based on video information of one channel and performing image display, comprising:

when said information signal is an information signal based on video information of a television signal in which the field frequency is fV1, the number of scanning lines in one frame is N1, each frame is constructed of first and second two fields each having N1/2 scanning lines, the phase relation is such that an n-th line in said second field is 2:1 interlaced for display on the screen between an m-th line and an (m+1)-th line in said first field and the horizontal scanning frequency is fH1 (=N1×fV1/2), reproduction means for inputting said information signal and reproducing a video information signal of one channel in each of the first and second fields every frame;

signal conversion means for converting the video information signal from said reproduction means into a display signal in which the field frequency fV is nearly twice that of said television signal (fV≈2×fV1), the number of scanning lines N has, within the same period of one frame as that of said television signal, a value which ranges from nearly twice to twice or more that of said television signal, first, second, third and fourth four fields are contained within the period of one frame, each of the four fields has the number of scanning lines having a value which is near N/4 and the horizontal scanning frequency fH has a value which ranges from nearly twice to twice or more that of said television signal, the conversion being such that an m-th line in the first field of said video information signal is related to an h-th line in the first field and an i-th line in the second field of said display signal and an n-th line in the second field of said video information signal is related to a j-th line in the third field and a k-th line in the fourth field of said display signal; and signal generation means for generating a synchronous information signal so structured as to cause said display signal to be displayed in such a phase relation that a k-th line in the fourth field is nearly 2:1 interlaced between an h-th line and an (h+1)-th line in the first field of said display signal, a j-th line in the third field is nearly 2:1 interlaced between an i-th line and an (i+1)-th line in the second field and the second and third fields are displaced by nearly 1/4 of a scanning line interval in the vertical direction in relation to the first and fourth fields, respectively.

2. An information signal display device according to claim 1, wherein said signal conversion means includes means for performing conversion such that the number of scanning lines N of said display signal satisfies N=4M+2 (where M is integer).

3. An information signal display device (FIGS. 3, 10, 12, 14A, 14B) for inputting one of at least two first and second information signals and performing image display, comprising:

when said first information signal is an information signal of one channel based on video information of a first television signal in which the field frequency is fV1, the number of scanning lines in one frame is N1, each frame is constructed of first and second two fields each having N1/2 scanning lines and the horizontal scanning frequency is fH1 (=N1×fV1/2), first reproduction means for inputting said first information signal and reproducing a video information signal of one channel in each of the first and second fields every frame of said first information signal;

first signal conversion means for converting the video information signal from said first reproduction means into a first display signal in which the field frequency fV is nearly twice that of said first television signal (fV≈2×fV1), the number of scanning lines N has, within the same period of one frame as that of said first television signal, a value which ranges from nearly twice to twice or more that of said first television signal, first, second, third and fourth four fields are contained within the period of one frame, each of the four fields has the number of scanning lines having a value which is near N/4 and the horizontal scanning frequency fH has a value which ranges from nearly twice to twice or more that of said first television signal; and first signal generation means for generating a synchronous information signal so structured as to cause said first display signal to be displayed in such a phase relation that respective lines to be displayed on the screen in one of said first, second, third and fourth fields do not overlap those to be displayed in another field.

4. An information signal display device (FIG. 12) according to claim 3, wherein said first signal conversion means includes:

means for performing conversion such that the number of scanning lines N of said first display signal satisfies N=4M+2 (where M is integer), an m-th line in the first field of said video information signal is related to an h-th line in the first field and an i-th line in the second field of said first display signal and an n-th line in the second field of said video information signal is related to a j-th line in the third field and a k-th line in the fourth field of said first display signal, whereby said first display signal is displayed in such a phase relation that a k-th line in the fourth field is nearly 2:1 interlaced between an h-th line and an (h+1)-th line in the first field of said first display signal, a j-th line in the third field is nearly 2:1 interlaced between an i-th line and an (i+1)-th line in the second field, and the second and third fields are displaced by nearly 1/4 of a scanning line interval in the vertical direction in relation to the first and fourth fields, respectively.

5. An information signal display device (FIG. 12) for inputting an information signal based on video information of at least two channels and performing image display, comprising:

when said information signal is information signals of two channels based on video information of a television signal in which the field frequency is fV1, the number of scanning lines in one frame is N1, each frame is constructed of first and second two fields each having N1/2 scanning lines and the horizontal scanning frequency is fH1 (=N1×fV1/2), reproduction means for inputting said information signal and reproducing a video information signal L of a first channel and a video information signal R of a second channel in each of the first and second fields of said information signal every frame thereof;

signal conversion means for converting the first channel video information signal L and second channel video information signal R from said reproduction means into a display signal in which the field frequency fV is nearly twice that of said television signal (fV≈2×fV1), the number of scanning lines N has, within the same period of one frame as that of said television signal, a value which ranges from nearly twice to twice or more that of said television signal, first, second, third and fourth four fields are contained within the period of one frame, each of the four field has the number of scanning lines having a value which is near N/4 and the horizontal scanning frequency fH has a value which ranges from nearly twice to twice or more that of said television signal, the conversion being such that an m-th line in the first field of said first channel video information signal L is related to an h-th line in the first field of said display signal, an m-th line in the first field of said second channel video information signal R is related to an i-th line in the second field of said display signal, an n-th line in the second field of said first channel video information signal L is related to a j-th line in the third field of said display signal and an n-th line in the second field of said second channel video information signal R is related to a k-th line in the fourth field of said display signal; and signal generation means for generating a synchronous signal so structured as to cause the display signal from said signal conversion means to be displayed in such a phase relation that a k-th line in the fourth field is nearly 2:1 interlaced between an h-th line and an (h+1)-th line in the first field of said display signal, a j-th line in the third field is nearly 2:1 interlaced between an i-th line and an (i+1)-line in the second field, and the second and third fields are displaced by nearly 1/4 of a scanning line interval in the vertical direction in relation to the first and fourth fields, respectively.

6. An information signal display device (FIGS. 3, 12, 14A and 14B) for inputting an information signal based on video information of at least two channels and performing image display, comprising:

when said information signal is information signals of two channels based on video information of a television signal in which the field frequency is fV2, the number of scanning lines in one frame is N2, each frame is constructed of first and second two fields each having N2/2 scanning lines and the horizontal scanning frequency is fH2 (=N2×fV2/2), reproduction means for inputting said information signal and reproducing a video information signal L of a first channel in the first half of each of the first and second fields and a video information signal R of a second channel in the second half every frame of said information signal;

signal conversion means for converting the first channel video information signal L and second channel video information signal R from said reproduction means into a display signal in which the field frequency fV is nearly twice that of said television signal (fV≈2×fV2), the number of scanning lines N has, within the same period of one frame as that of said television signal, a value which is equal to or near that of said television signal, first, second, third and fourth four fields are contained within the period of one frame, each of the four fields has the number of scanning lines having a value which is near N/4 and the horizontal scanning frequency has a value which is equal to or near fH2, the conversion being such that an m-th line in the first half of the first field containing said first channel video information signal L and an m'-th line in the second half of the first field containing said second channel video information signal R are related to an h-th line in the first field and an i-th line in the second field of said display signal, respectively, and an n-th line in the first half of the second field containing said first channel video information signal L and an n'-th line in the second half of the second field containing said second channel video information signal R are related to a j-th line in the third field and a k-th line in the fourth field of said display signal, respectively; and signal generation means for generating a synchronous information signal so structured as to cause the display signal from said signal conversion means to be displayed in such a phase relation that respective lines to be displayed on the screen in one of said first, second, third and fourth fields do not overlap those to be displayed in another field.

7. An information signal display device (FIGS. 3, 10, 12, 14A and 14B) for inputting an information signal based on video information of at least two channels and performing image display, comprising:

when said information signal is information signals of two channels based on video information of a television signal in which the field frequency is fV2, the number of scanning lines in one frame is N2, each frame is constructed of first and second two fields each having N2/2 scanning lines and the horizontal scanning frequency is fH2 (=N2×fV2/2), a reproduction processor for inputting said information signal and reproducing a video information signal L of a first channel in the first field and a video information signal R of a second channel in the second field of said information signal every frame thereof; and a signal converter for converting the first channel video information signal L and second channel video information signal R from said reproduction processor into a display signal in which the field frequency fV is nearly twice that of said television signal (fV=2×fV2), the number of scanning lines has, within the same period of one frame as that of said television signal, a value which is equal to or near N2, first, second, third and fourth four fields are contained within the period of one frame, each of the four fields has the number of scanning lines having a value which is near N2/4 and the horizontal scanning frequency has a value which is equal to or near fH2, the conversion being such that an m-th line occurring every other line and an m'-th line occurring every other remaining line in the first field containing said first channel video information signal L are related to an h-th line in the first field and a j-th line in the third field of said display signal, respectively, and an n-th line occurring every other line and an n'-th line occurring every other remaining line in the second field containing said second channel video information signal R are related to an i-th line in the second field and a k-th line in the fourth field of said display signal, respectively.

8. An information signal display device (FIG. 12) according to claim 7, wherein said signal converter includes signal generation means for generating a synchronous information signal so structured as to cause said display signal to be displayed in such a phase relation that a k-th line in the fourth field is nearly 2:1 interlaced between an h-th line and an (h+1)-th line in the first field of said display signal, a j-th line in the third field is nearly 2:1 interlaced between an i-th line and an (i+1)-th line in the second field, and the second and third fields are displaced by nearly 1/4 of a scanning line interval in the vertical direction in relation to the first and fourth fields, respectively.

9. An information signal display device (FIGS. 3, 9 and 12) for inputting an information signal based on video information of one channel and performing image display, comprising:

when said information signal is an information signal based on video information of a television signal in which the field frequency is fV2, the number of scanning lines in one frame is N2, each frame is constructed of first and second two fields each having N2/2 scanning lines and the horizontal scanning frequency is fH2 (=N2×fV2/2), a reproduction processor for inputting said information signal of one channel in each of the first and second fields every frame of said information signal; and a signal converter for converting the video information signal from said reproduction processor into a display signal in which the field frequency fV is nearly twice that of said television signal (fV=2×fV2), the number of scanning lines has, within the same period of one frame as that of said television signal, a value which is equal to or near N2, first, second, third and fourth four fields are contained within the period of one frame, each of the four fields has the number of scanning lines having a value which is near N2/4 and the horizontal scanning frequency has a value which is equal to or near fH2, the conversion being such that an m-th line occurring every other line and an m'-th line occurring every other remaining line in the first field of said video information signal are related to an h-th line in the first field and an i-th line in the second field of said display signal, respectively, and an n-th line occurring every other line and an n'-th line occurring every other remaining line in the second field of said video information signal are related to a j-th line in the third field and a k-th line in the fourth field of said display signal, respectively.

10. An information signal display device according to claim 9, wherein said signal converter includes signal generation means for generating a synchronous information signal so structured as to cause said display signal to be displayed in such a phase relation that respective lines to be displayed on the screen in one of said first, second, third and fourth fields do not overlap those to be displayed in another field.

11. A display device for displaying a video information signal in which a first and a second field are repeated in a predetermined period T including:

signal conversion means for converting an inputted video information signal into a display signal in which first, second, third and fourth fields are repeated in the period T; and signal display means for displaying the display signal by line-off setting the display signal so that line scanning positions are not overlapped between the first, second, third and fourth fields.

12. The display device according to claim 11, wherein said first and second fields of said inputted video information signal each have N lines, and a field frequency fv is given by fv=2/T, and the display signal produced by said signal conversion means includes a field frequency 2fv approximately two times the field frequency of the inputted video information signal, and each of the first, second, third and fourth fields includes almost N lines or lines more than N, or includes almost 4N or lines more than N in said period T.

13. The display device according to claim 11, wherein said signal display means displays the first field of said inputted video information signal in connection with the first and second fields of said display signal, and displays the second field of said inputted video information signal in connection with the third and fourth fields of said display signal, and the first and the fourth fields, and the second and the third fields of said display signal are vertically interlaced (1/2 line off-set) and are displayed in such a phase relation that the second field is vertically off-set in almost 1/4 line against the first field.

14. The display device according to claim 11, wherein said inputted video information signal includes video information of at least a first and a second channel, and said signal display means displays the video information of said first channel of said inputted video information signal in connection with the first and third fields of said display signal, and displays the video information of said second channel of said inputted video information signal in connection with the second and fourth fields of said display signal.

15. A display device for displaying a video information signal in which a first and a second field are repeated in a predetermined period T by using an indicator including:

signal conversion means for converting an inputted information signal into a display signal in which first, second, third and fourth fields are repeated in the period T and for outputting the converted display signal; and synchronizing information generating means for generating a synchronizing information to display the display signal by line-off setting the display signal so that line scanning positions are not overlapped between the first, second, third and fourth fields, and for outputting the synchronizing information together with the display signal or independently of the display signal.

* * * * *